US010827309B2

(12) United States Patent
Thomas

(10) Patent No.: US 10,827,309 B2
(45) Date of Patent: Nov. 3, 2020

(54) SYSTEMS AND METHODS FOR DETERMINING TEXTING LOCATIONS AND NETWORK COVERAGE

(71) Applicant: David Thomas, Longmont, CO (US)

(72) Inventor: David Thomas, Longmont, CO (US)

(73) Assignee: David Thomas, Longmont, CO (US)

( * ) Notice: Subject to any disclaimer, the term of this patent is extended or adjusted under 35 U.S.C. 154(b) by 0 days.

(21) Appl. No.: 16/518,277

(22) Filed: Jul. 22, 2019

(65) Prior Publication Data

US 2019/0342721 A1 Nov. 7, 2019

Related U.S. Application Data

(63) Continuation of application No. 15/871,640, filed on Jan. 15, 2018, now Pat. No. 10,362,448.

(51) Int. Cl.
| | | |
|---|---|---|
| *H04M 1/725* | (2006.01) | |
| *H04W 4/029* | (2018.01) | |
| *H04W 4/14* | (2009.01) | |
| *H04W 4/90* | (2018.01) | |
| *H04W 4/024* | (2018.01) | |
| *H04W 4/021* | (2018.01) | |

(52) U.S. Cl.
CPC ....... *H04W 4/029* (2018.02); *H04M 1/72536* (2013.01); *H04W 4/021* (2013.01); *H04W 4/024* (2018.02); *H04W 4/14* (2013.01); *H04W 4/90* (2018.02)

(58) Field of Classification Search
CPC ......... H04W 4/029; H04W 4/14; H04W 4/90; H04W 4/024; H04W 4/021; H04M 1/72536; H04M 1/72516
See application file for complete search history.

(56) References Cited

U.S. PATENT DOCUMENTS

| | | | | |
|---|---|---|---|---|
| 10,616,719 | B2* | 4/2020 | Thomas | H04L 69/40 |
| 2005/0239477 | A1* | 10/2005 | Kim | H04W 76/50 |
| | | | | 455/456.1 |
| 2007/0189246 | A1* | 8/2007 | Molnar | H04L 29/06027 |
| | | | | 370/338 |
| 2010/0098045 | A1* | 4/2010 | Miyazaki | H04B 7/15557 |
| | | | | 370/342 |
| 2015/0097674 | A1* | 4/2015 | Mondal | H04W 4/029 |
| | | | | 340/572.1 |
| 2017/0006447 | A1* | 1/2017 | Bahta | H04W 4/90 |
| 2017/0156136 | A1* | 6/2017 | Tavildar | H04W 74/0833 |

* cited by examiner

*Primary Examiner* — Joseph E Dean, Jr.
(74) *Attorney, Agent, or Firm* — Kunzler Bean & Adamson

(57) ABSTRACT

A method for receiving an emergency communication includes receiving a first portion of a first communication. The method also includes receiving a second portion of a second communication. The second communication may be a duplicate of the first communication. The method includes reconstructing the first communication using the first portion and the second portion.

17 Claims, 9 Drawing Sheets

SYSTEMS AND METHODS FOR DETERMINING TEXTING LOCATIONS AND NETWORK COVERAGE

CROSS-REFERENCES TO RELATED APPLICATIONS

This application is a continuation application of U.S. patent application Ser. No. 15/871,640 entitled "SYSTEMS AND METHOD FOR DETERMINING TEXTING LOCATIONS AND NETWORK COVERAGE" and filed on Jan. 15, 2018 for David Thomas, now U.S. Pat. No. 10,362,448 which issued on Jul. 23, 2019, which is incorporated herein by reference in its entirety.

TECHNICAL FIELD

The present disclosure relates generally to the field of cellular phone networks; more particularly, to the field of determining texting locations; and, more particularly still, to systems, methods, and software that can be utilized to gather data on physical texting locations and associated network coverage such that said data can be employed to help locate someone who is lost or in distress, among other uses.

BACKGROUND

Widespread acceptance and mainstream use of mobile/cellular phones has occurred in most areas of the world between five and twenty years ago. Two decades past, very few networks could be found that had broad coverage across significant geographic areas. However, within fifteen years, many well-populated areas were subsequently blanketed by multiple cellular networks. This is especially true for the more developed countries. For example, in the United States, cellular networks blanket huge swaths of territory with only isolated pockets having poor or no cellular service/signal.

Nevertheless, it is just these areas that still lack cellular service that pose a potential hazard; for in such places, if a person becomes lost, injured or is otherwise in distress, his or her cell phone ceases to be a reliable link to outside help. Importantly, such areas can be rugged, wild, and otherwise somewhat dangerous—often the vary traits that draw people to them. Typical adventure seekers who travel through such areas include hikers, mountain bikers, back-country skiers, off-road motorcyclists, four-wheel-drive enthusiasts, etc. As people travel, they will cross in and out of cellular service, often without realizing where they can make or receive calls or text messages (SMS). As long as the adventure continues without incident, such events go unnoticed. But if there is an emergency and an adventurer suddenly finds himself or herself needing outside assistance, whether the location they are in has cell service or not can become a life-or-death question. If the person is still at least somewhat mobile and finds that there is no cell service, locating the nearest cell service and getting there as quickly as possible can be critical.

What is needed are systems and methods for determining texting locations and network coverage so that adventurers can quickly and easily relocate to such areas in an emergency to make contact and secure assistance. Additionally, even if no emergency exists, it can be extremely useful for a cellular user to know where nearby service locations can be found so that he or she can send text messages and/or make phone calls when desired. Having a database of such information at hand can allow for better trip/adventure planning so that check-ins with family/friends can be made and one can efficiently relocate to a location where texts or voice calls can be sent when needed. Furthermore, if an adventurer occasionally checks in with another person or even via an automated system, and subsequently becomes lost or otherwise fails to report in, emergency responders will have a good idea of that person's last known location and can dramatically narrow the search area, when such assistance is required.

One way to address these needs is through a smartphone application (or "app") that can provide a simple, quick, low-cost means for people to communicate their location and/or other information. Since advanced, high-bandwidth "4G" network coverage is much less ubiquitous than earlier generation systems capable of only voice calls and SMS messaging, it is preferred that such an app rely on the SMS systems. An additional benefit of using the SMS system is that communications can often get through even with extremely low quality cell coverage.

There are many other features and benefits of such an app and associated systems and methods that will become apparent as the disclosure is explained in more detail below.

BRIEF SUMMARY

In one embodiment, a method includes receiving a first portion of a first communication. The method also includes receiving a second portion of a second communication. The second communication may be a duplicate of the first communication. The method includes reconstructing the first communication using the first portion and the second portion.

In some embodiments, a method includes receiving a communication having an emergency indicator. The method also includes identifying the emergency indicator in the communication. The method includes, in response to identifying the emergency indicator, transmitting an emergency communication to an emergency responder.

In certain embodiments, a method includes sending a set of communications from a first device. The set of communications may not be initiated by a user. The method also includes receiving one or more indications in response to sending the set of communications. The one or more indications may correspond to one or more communications of the set of communications and may indicate reception of the one or more communications. The method includes storing information based on the one or more indications. The information may identify one or more of: at least one location from which the first device sent a communication, one or more devices that received the communication, and an acknowledgment was received indicating that the one or more devices received the communication; at least one location from which the first device sent a communication, the one or more devices that received the communication, and no acknowledgement was received indicating that the one or more devices received the communication; and at least one location from which the first device sent a communication and the one or more devices did not receive the communication.

In various embodiments, a method includes receiving one or more communications from a first device. The method also includes storing first information based on the one or more communications from the first device. The first information may correspond to one or more locations from which the one or more communication were sent from the first device.

In one embodiment, a method includes attempting to send an emergency communication from a device using multiple carriers. The method also includes, in response to the emergency communication not being sent, displaying a map indicating prior successful communication locations for the multiple carriers.

DETAILED DESCRIPTION

Figure 1:
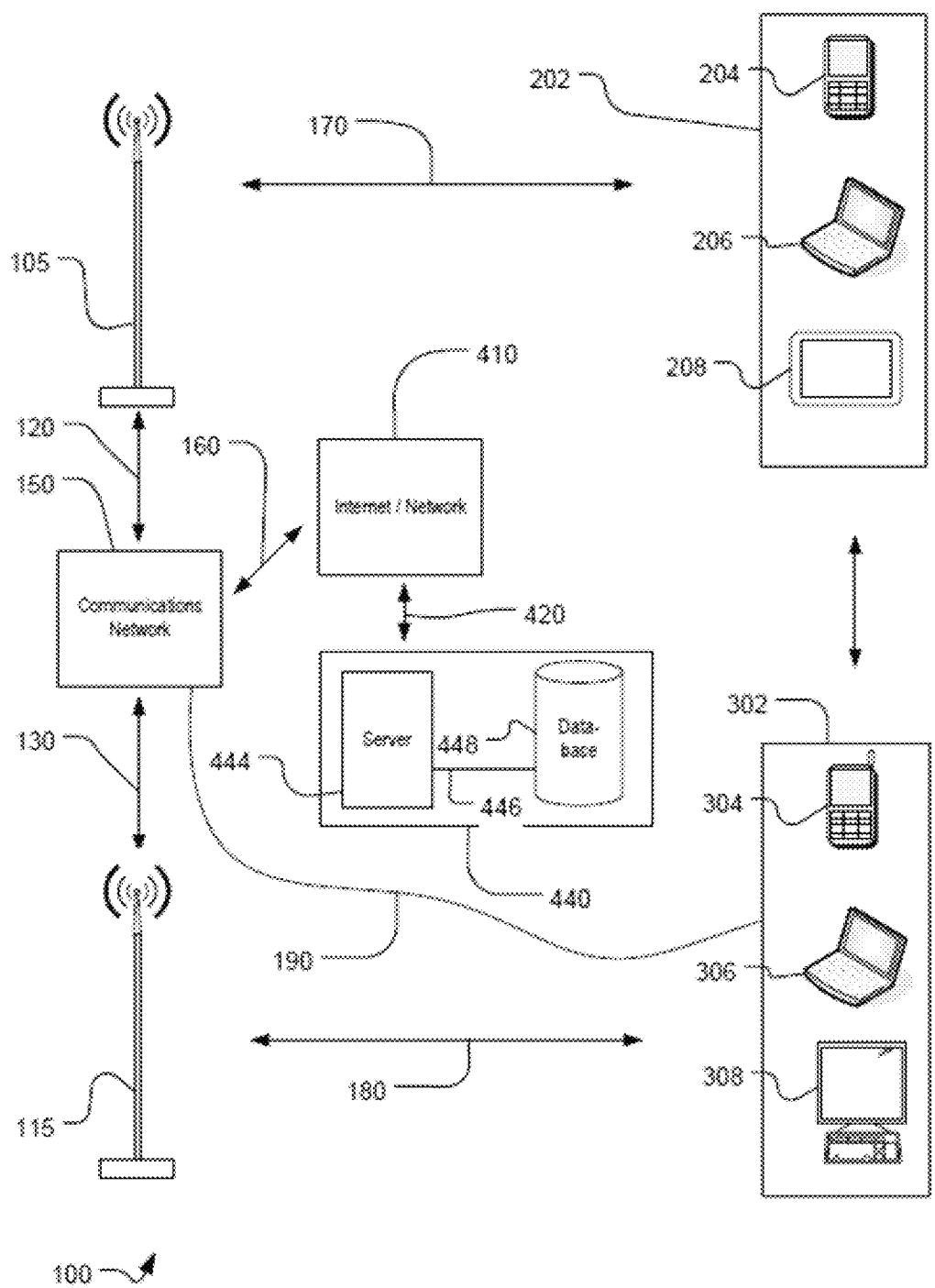
FIG. 1 illustrates systems that can be utilized to determine texting locations and coverage.

In the following discussion, numerous specific details are set forth to provide a thorough understanding of the present disclosure. However, those skilled in the art will appreciate that embodiments may be practiced without such specific details. Furthermore, lists and/or examples are often provided and should be interpreted as exemplary only and in no way limiting embodiments to only those examples. Similarly, in this disclosure, language such as "could, should, may, might, must, have to, can, would, need to, is, is not", etc. and all such similar language shall be considered interchangeable whenever possible such that the scope of the disclosure is not unduly limited. For example, a comment such as: "item X is used" can be interpreted to read "item X can be used".

Various embodiments are described below in the accompanying Figures. The following detailed description provides a comprehensive review of the drawing Figures in order to provide a thorough understanding of, and an enabling description for, these embodiments. One having ordinary skill in the art will understand that in some cases well-known structures and functions have not been shown or described in detail to avoid unnecessarily obscuring the description of the embodiments.

Referring now to the drawings, FIG. 1 illustrates systems that can be utilized to determine texting locations and coverage 100. The systems include four groups of components: those labeled in the 100-199 range include the large-scale, often "public" communications systems; those in the 200-299 range include the mobile end-user devices; those in the 300-399 range include the fixed-location and mobile buddy user devices; and those in the 400-499 range include the Internet/Network and server/database assets.

The large-scale, often "public" communications systems can include such items as cellular telephone towers 105 and 115, the public communications network 150 (and/or additional private systems), and the connection links and transmissions between and among such systems and the users thereof. The connections illustrated in FIG. 1 include: mobile connection links 170 between the mobile traveler cellular telephone tower 105 and the end-user mobile devices 202; system transmission links 120 between the mobile traveler cellular tower 105 and the communications network 150; additional system transmission links 130 between the communications network 150 and the buddy cellular tower 115; mobile transmission links 180 between the buddy cellular tower 115 and the buddy user devices 302; wired transmission links 190 between the communications network 150 and the buddy user devices 302; and connection transmission links 160 between the communications network 150 and the Internet/Network 410.

The Internet/Network 410 can include any of the devices/networks that make up the Internet as well as private communications networks and devices that are utilized to allow the source equipment 440 to communicate with the communications network 150. The source equipment 440 can include a plurality of servers 444, a plurality of databases 448, and the source communication links 446 interconnecting them. The source equipment 440 hosts the apps and systems information and makes them available for download to the end-users and buddies as well as storing, organizing, and developing the information databases that are built from data gathered/submitted by the end-users and buddies (and other sources) regarding texting locations and network coverage.

The end-user mobile devices 202 can include any mobile electronic device that can communicate with the systems. Examples of such devices include cellular telephones 204, portable computing devices 206, and tablet computers 208. Additional possible devices can include GPS/location devices, mobile radio communications devices, dedicated tracking/location devices installed in cars/bicycles/etc., satellite communications devices, etc. One embodiment of the disclosure includes a mobile end-user utilizing a smart phone 204 upon which the user has installed an Adventure Rescue Locator (ARL) smartphone app. See later Figures and Descriptions for more information about embodiments of the ARL app.

The buddy user devices 302 can include mobile devices as well as fixed-location devices. For example, buddy users can employ buddy cellular phones 304 or buddy portable computing devices 306 and so be connected via mobile devices. Additionally, buddy users can employ less-mobile devices, sometimes referred to as "fixed-location" devices such as desktop computing devices 308 that may be connected via wired transmission links 190 to the communications network 150. Such devices can also (or alternatively) be connected via mobile transmission links 180; and although they are often more difficult to move around, they can be relocated and used in somewhat "mobile" ways (such as in a car, recreational vehicle, camper, etc.).

The systems illustrated in FIG. 1 allow the mobile end-user to communicate with the buddy end-user, and both can communicate with the source equipment, such that the methods of the present disclosure can be carried out over the described systems.

Figure 2:
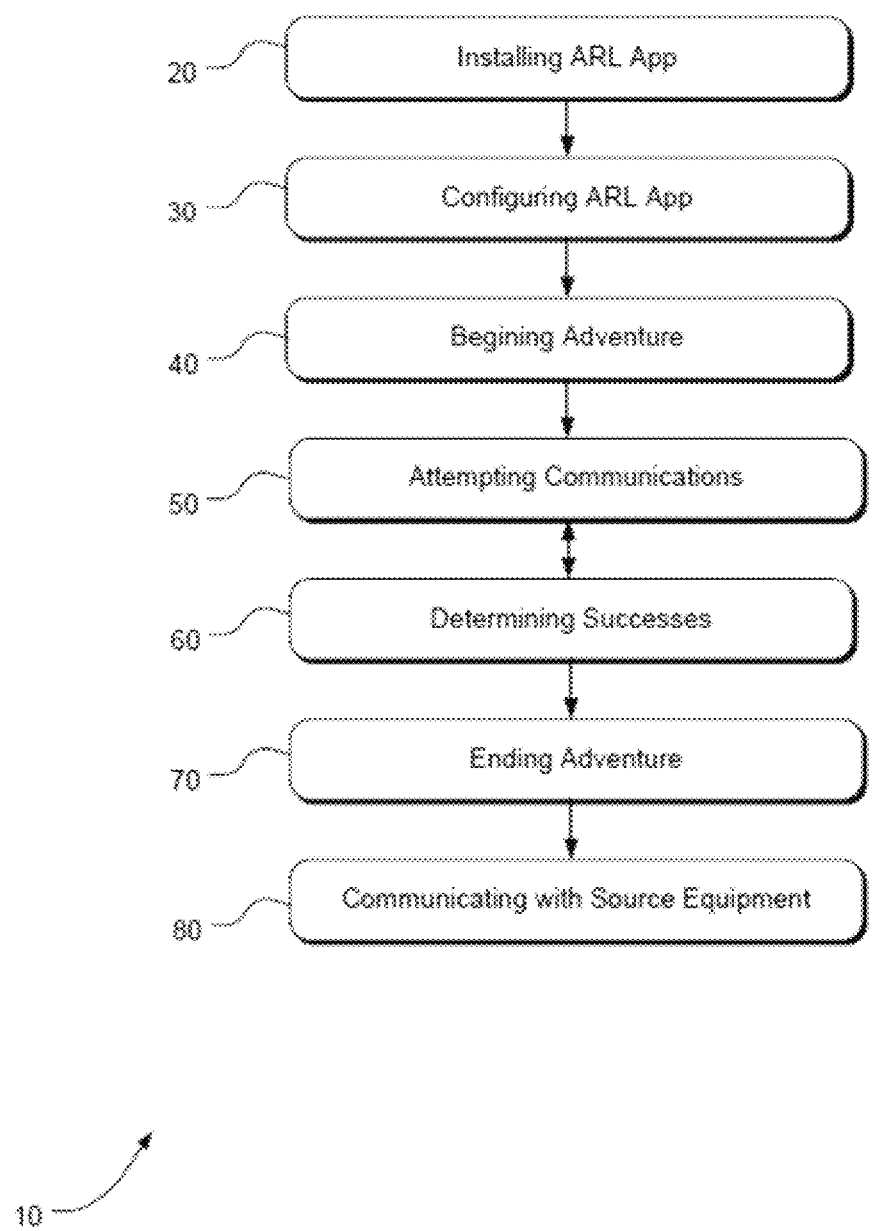
FIG. 2 illustrates methods that can be utilized to determine texting locations and network coverage.

FIG. 2 illustrates a method that can be utilized to determine texting locations and network coverage 10. The illustrated steps include: installing ARL app 20, configuring ARL app 30, beginning adventure 40, attempting communications 50, determining successes 60, ending adventure 70 and communicating with source equipment 80. Additional steps are contemplated. Although the arrows between the different steps may imply sequential operations which often follow one to another, nothing in this application should be construed to limit the methods to sequential operations only, as the steps can occur out of order whenever desired. For example, during the Adventure, a user may employ step 30, configuring ARL app, if he or she determines that reconfiguring is desired.

The installing ARL app step 20 can involve the mobile end-user (the "adventurer") navigating to the source equipment on their smart phone's internet browser (or using an application store and download app) to download the ARL app to their smart phone. Additionally, if the adventurer is going to be utilizing an end-user mobile device 202 that is not a smart phone, the adventurer will undertake whatever proprietary steps are required to install the ARL app on the desired mobile device 202.

The configuring ARL app step 30 can involve launching the ARL app and configuring it for the device upon which it is installed. Additionally, the adventurer can configure the ARL app to customize it for his or her own adventuring needs. Once set, the configuration(s) are not necessarily designed to be static, but can instead be updated whenever desired. For example, depending on the type of adventure, a given adventurer may want to change some of the configuration settings: whether to send check in tasks automatically or manually, various settings for power conservation, whether discovery mode is on or off.

The beginning adventure step 40 encompasses launching the ARL app at the beginning of the adventure. A particular buddy (or multiple) may be chosen, the type of adventure may be selected to help with preparing the app to display the most used options for that adventure type, an appropriate background image for the app may be selected to set the "tone" for the adventure (note that the choice of options, adventure type, image, etc. can be used to target display ads on the Buddy app and/or the ARL app), etc. Additionally, the app can begin communications with the on-board Global Positioning System or other "location determination" app/software/device in order to track and map the location of the adventurer throughout the adventure.

At the start of an adventure (e.g., a hike, mountain bike ride, motorcycle ride, horse ride, canoe trip, hang-glide, etc.) the adventurer notifies the contact person (Buddy) that they are starting an adventure either through the app or external thereto. If the app is used, the system can supply information to the Buddy including such items as the starting location, expected destination, route, conveyance info, time they will be returning home, etc. The app can provide a "start adventure" screen for this purpose, which would store this info, allowing the adventurer to quickly assemble it into a "starting adventure" text, to be sent to the contact person.

The attempting communications step 50 can involve a number of different communications. For example, in one embodiment, the mobile end-user can initiate a "Check In" by pressing a "Check In" button on the app's user interface. This action can cause the app to initiate a check in text message (SMS or otherwise) that the mobile device attempts to send to the designated buddy(ies). Another type of communication might be an attempted phone call to determine if cellular phone voice service is available. Yet another type of communication could be an attempt to connect to the Internet over a 3G/4G type connection or a Wi-Fi connection. Additionally, the app could attempt to send an email. In another embodiment, the check in operation could be initiated automatically based on elapsed time or distance since previous check in.

Whatever the type of communication that is attempted, it can include one or more of such basic items as location data, date, time, phone version, provider, etc. or it can also include custom information (some of this data may be incorporated only at the beginning or end of the adventure). As an example, location data can comprise a link to "Google Maps" that displays the adventurer's location on a map on the Google Maps website when clicked.

Custom information can be pre-created "canned" messages such as "I'm fine", "Adventure Going Great", "Right on Track", "Running Late", "Need You to Call for Help", "Emergency, Send Help Now!", etc. In another embodiment, the custom information can be created by the user on the fly and/or can be previously prepared and made ready for selection as desired.

Yet another communication that is attempted can be one that is sent to the source equipment 440. This can be a text, voice message, Internet communication, etc. and it can provide information like that sent to the Buddy (in fact, an automated Buddy can be set up by the user on the source equipment 440, for example, when another person who normally acts as a Buddy is not available). When an auto-buddy is configured, a particular communication could trigger switch-over to a real person Buddy instead (say if an emergency situation developed during the adventure). In another embodiment, the communications with the source equipment 440 could have enhanced information in addition to that normally transmitted to a Buddy. In yet another embodiment, the attempting communications step 50 could send communications to a custom website for a given adventurer that is then updated and Buddy(ies) can log into the website and see the adventurer's communications, locations, etc. Such a website could automatically send tweets, make blog updates, send emails, etc. In alternate embodiment, either the ARL app or the Buddy app could send the tweets, blog posts, emails, etc. directly.

Whatever the nature of the communication, the app logs the communication attempt with a location from the location determination app/software/device and stores that information locally.

In another embodiment, the attempting communications step 50 can also involve the app polling the operating system automatically to determine whether or not service is available and then tracking that result (including strength of signal, date, time, and any other information) along with the location of the device as reported by the "location determination" app/software/device. In one embodiment, only user-initiated communication attempts are made; in another embodiment, only automated, app-initiated communication attempts are made; and in yet another embodiment, either or both are made.

The determining success step 60 involves the ARL app communicating with the device (often, communicating with the operating system) to determine whether or not the attempted communication from step 50 succeeded or failed. If a failure occurred, the ARL app wants to know whether the failure was due to an absence of cell service or not. If not, the app can simply re-attempt the communication and/or inform the user that some other non-network problem exists. If the failure was because there was no service, the ARL app can enter a "check in" state called "waiting for service", update the user interface to let the user know that a check in is in progress and that it is waiting for service, and then wait for notification from the operating system that service has been restored. Additionally, the app then logs the unsuccessful communication attempt with a location from the location determination app/software/device so that it knows where no service was found.

In addition to the ARL app communicating with the device/operating system to determine success or failure of the attempted communication, the app can also look for an acknowledgment communication arriving from the contacted Buddy app (or source equipment 440). When the Buddy app sends a confirmation back to the ARL app, it is positive confirmation that the original communication was successfully sent; whereas the device, operating system, etc. may report a communication success incorrectly. Note that an acknowledgment can be sent but may not be received by the device/ARL app. In such cases, it may be useful to have the ARL app ask for a complete history of check ins when it has reliable signal (such as after the adventure). Also, acknowledgments could contain redundancies such that a single message might contain acknowledgment information for multiple past communications from the ARL app. In this way, if any one of a set of acknowledgments were received, the ARL app would know whether multiple past communications were successful or not.

If the communication was conducted successfully, the ARL app can update the "check in" state to "not checking in" and let the user know that the check in communication was successful. Additionally, the app can then log the successful communication attempt with a location from the location determination app/software/device.

The determining success step 60 can point back to the attempting communications step 50 as needed. For example, when it is determined that the attempted communication failed and service has since been restored, then the app initiates another attempting communications step 50 and tries to resend the message. This, in turn, causes another determining success step 60 to be invoked in case the communication again fails.

The ARL app can wait to be notified whenever network coverage is restored and then it can determine the "check in" state to see whether it is in a "checking in" or "not checking in" state. If the former, it can call the attempting communications step 50. If the latter, no new automated communication is necessary.

The ending adventure step 70 is initiated by the adventurer after she or he has completed the adventure and returned "home" (which can refer to any designated location, such as the car, camp, house, building, boat, airplane, garage, etc.). The ARL app can initiate any designated end-of-adventure actions such as attempting communications with the buddy(ies) to notify he/she/them that the adventure is over and the user is "home" safe (custom and/or canned messages can be included); logging the adventure information to an app database on the device; showing the adventurer a map of the adventure highlighting where check-ins were attempted, whether or not they were successful, were service was available and not available, etc.; and suggesting end-of-adventure activities such as going to a nearby restaurant for a meal.

The communicating with source equipment step 80 can be undertaken automatically by the ARL app whenever it has the ability to communicate with the source equipment 440 (or it can be initiated by the user). The communication can be accomplished over 3G/4G mobile networks, Wi-Fi, or any other suitable link to the communications network 150. During this step, the app can transfer data concerning the determined locations at which texting/communicating was successful, those where it was unsuccessful, the results of any polling of cell service conducted during the adventure, details about the adventure itself (including GPS/location information), etc.

This transfer of data allows the source equipment 440 to build up the database(s) of cell texting/signal/service locations and "dead-zones" where no service is available. This valuable data can then be made available to users' ARL apps to reduce the need for polling or otherwise attempting to communicate in dead-zones, and for other uses. Additionally, the data can be sold or otherwise used as information about network availability is valuable information. Furthermore, because the ARL app can also report device type, service provider, etc., this data can include such useful information as service-provider specific information about network availability and signal strength; telephone-specific information about network availability and signal strength; etc. With enough such datasets, one could compare how well certain phones and/or providers allow communications and future adventurers (and others) could then favor those who perform the best.

When a check is initiated, it can be launched automatically or by direct user action (for example, the adventurer pressing the check in button on the user interface of the app). In some embodiments, check ins can be initiated automatically after a certain amount of time/distance has passed since the previous check in or when the user is in close proximity to a known texting location. When the check in is initiated, the app obtains the location from the GPS unit, formats a text message, and attempts to send it.

The app then waits for a response from the operating system (e.g., using a broadcast receiver) indicating that the text message either was sent successfully or failed to get through. If the check in text was sent successfully, the app indicates this on the user interface and the check in is done.

If the text failed to get through, the action taken by the app depends on the reason for the failure. If the text did not get through because the adventurer moved totally out of cell coverage, the app could move into a lower power-consumption state until the adventurer moves back into cell coverage. At this point, the app obtains the current location from the GPS unit, formats a new check in text, and attempts to send it again. If a text fails to get through for a reason other than leaving cell coverage, the app simply formats a new text message (using the current location) and tries again to send it.

The status of the check in, including whether the app is currently attempting to send a text, or is waiting to reenter cell coverage, is all indicated on the user-interface, to keep the user informed about what is going on. In one embodiment, the app makes an audible sound whenever a check in text goes through. This is helpful because the phone may be in a pocket or backpack, and may have been trying for a long time in some cases, to get the check in text to go through.

A useful option on the user-interface is that the distance to the previous check in can be displayed. This is to help the adventurer know how far that she/he has traveled, and therefore, whether it is time to check in again. One subtlety about the operation of this app is that when considering the distance to the previous check in, there are as many as four different distances to pay attention to, and for different reasons.

The first important distinction between these four distances arises because in practice, in areas with little or no cell coverage, the app determines the user's location and attempts to send a text, but if the user is moving, and the text does not go through right away, the location indicated in the text (in the simplest case, where the user was when the check in was initiated) may differ from the user's location when the text actually goes through. The app therefore keeps track of two different locations relating to a specific check in: the locationSentInText, and the actualLocationWhenSent. Under ideal cell coverage, (i.e. the check in goes through immediately), these locations/distances will be essentially identical.

On the user interface, both of these distances can be displayed. Their relevance to the adventurer is that the locationSentInText is where search and rescue would start looking for him/her, in the event of a problem. The actualLocationWhenSent, however, is very useful because this is a texting location. This means that if the adventurer goes to this specific location, he/she will likely be able to send and receive text messages. These locations could be displayed on a map on the app, or more simply, the distance to each of these locations can be displayed on the user interface. In this instance, the Adventure simply needs to backtrack until the distance to the actualLocationWhenSent is near zero, and she/he will most likely be able to send text messages.

That accounts for two of the four distance numbers on the UI. The aforementioned distances are straight line distances or "as the crow flies". It is important to understand the implications of distance traveled versus straight-line distance. As an example, if the adventurer is hiking on switchbacks, they may actually see the distances becoming smaller as they hike, if the trail reverses back toward the check in location(s). People think that as they are progressing up the trail, the distance(s) to the previous check in should get larger, not smaller. Hence the need for two other numbers, which are "distanceTraveledSinceLocationSentInText," and "distanceTraveledSinceActualLocationWhenSent." Both of these are calculated by sampling the user's location frequently (for example, every five seconds), and adding the distances between the location samples, all the way back to the locationSentInText and the actualLocationWhenSent. These two numbers should be fairly close, for example, to the reading on a car odometer used to measure the same distances. Note that in low power-consumption mode, this location sampling is turned off (to keep the GPS from consuming power), so the distances traveled are not available.

The quality of a particular CheckIn is determined by the quality of the information provided by the GPS or location determination device/software/etc. (hereinafter "GPS"). On other GPS-using apps that are not intended to be life-saving, it is not as important that the information displayed be accurate to a high-degree. But in the case of the ARL app, providing as accurate as possible information about the adventurer's location can mean the difference between life and death. There are two potentially deadly errors in the information provided by the GPS. These are: the GPS fix is inaccurate, and the GPS fix is old/out of date.

The "GPS fix can be inaccurate" when the phone or mobile device was in the adventurer's pocket or another location where it did not have a sufficient view of the sky to create an accurate GPS fix. It could also be because the GPS was only recently started up and hasn't yet had time to acquire an accurate fix. Note that the term "phone" may be used throughout this application and includes all other mobile devices that can be utilized in place of a phone The "GPS fix is old/out of date" can occur when the phone has been in a location (as above) where the GPS unit was unable to get a GPS fix. In this case, the operating system will provide the location where the phone was the last time it was able to obtain an accurate GPS fix. In some cases, considerable time may have passed since the phone had an accurate GPS fix, and the user's location may have changed significantly during this time.

Fortunately, one operating system, Android, provides helpful information along with the GPS coordinates, to help mitigate this problem. The accuracy of the GPS fix is provided in the location object provided to the app from the Android system when the GPS is queried. The time (timestamp) of the GPS fix is also provided in this location object. The app may thus calculate the age of the GPS fix by subtracting its timestamp from the current time.

Both the accuracy and the timestamp of the GPS fix can be provided in the check in text messages sent from the adventurer to the contact person. This is to aid search and rescue in determining the adventurer's likely location in the event of an emergency. In one embodiment, the text message includes both the accuracy and the age of the GPS fix, as well as the timestamp of the GPS fix. Additionally, the accuracy and age of the GPS fix can be indicated on the user interface in order to help the adventurer decide whether to send a check in with the current information provided by the GPS, or to wait for the GPS to obtain better info.

The practical reality is that even poor quality GPS info being provided to rescuers is vastly superior than providing no information whatsoever. Even if the location given is off by a few hundred yards, or indicates where the adventurer was at some point in the past, it provides a starting point for search and rescue efforts that is likely much nearer to the adventurer than whatever information would be available if he or she weren't using the ARL app. Nonetheless, by providing the information about accuracy and GPS fix age to rescuers, they will be able to more quickly assess the situation and likely be more able to more quickly find the adventurer(s) in distress.

Certain embodiments of the app can have the ability to automatically send a repeat check in, in the event that a previous check in had a quality issue. A quality issue could be a problem with the location, as described above. It could also be that there was a significant distance between the locationSentInText and the current location. This is generally a result of the adventurer attempting to initiate a check in when there is not sufficient cell coverage to do so. As described previously, the app may not be able to get a check in text through until the adventurer has moved a distance to a location where it is possible to do so. The app can watch for this situation and if the distance between the actualLocationWhenSent and the locationSentInText is significant, it can repeat the check in operation. In most cases, this repeat check in will go through easily, because it happens immediately after the previous check in text was sent, so the app is known to be in a texting location at that point.

The app can also initiate a repeat check in when the previous check in had quality issues with its GPS info. In this instance, it can be desirable for the app to wait until the GPS issues have been resolved before initiating the repeat check in.

A handy feature of the app is the ability to periodically initiate a check in operation automatically, without the user needing to press the "check in" button. The app can be configured to initiate the auto check in after either a certain amount of time or distance has passed or when the adventurer nears a known texting location. This is a useful feature that allows the adventurer to ignore the app and the phone and be completely immersed in their adventure.

In its simplest form, it is possible for a person to conserve their cell phone battery simply by watching for their location on a map (most likely on their phone), as it relates to indicated proximity of texting locations. When the map (or the ARL app) indicates that they are near a texting location, they can simply push the check in button. It is most likely that the check in will be successful, since they are at or near a known texting location. If the adventurer is adventuring in a familiar place, it is likely that they will remember where the texting locations are. In this case, they could just wait until they have arrived at one, and push the "Check In" button.

There is also the possibility of automating this process. In one scheme, the app would remain in a dormant/low power consumption state, periodically waking up to check on its location, until it wakes up and finds it somewhat near a known texting location. At that point, it would stay awake until it is within a few hundred feet of the known texting location, and begin checking in. It is expected, but not guaranteed, that the check in would be successful, because they would be at or near a known texting location. In the event that it doesn't check in successfully, they could cancel the check in, or spend some time moving around at or near the texting location, to see if it goes through on another attempt.

Another automation can be for the app to enter a dormant/power saving state (with its service stopped) as long as its location matches a location where it is known to be impossible to send a text. Specifically, this would be an area explored previously (by the current adventurer or one or more other adventurers, via data from the source equipment) where there was no cell coverage at all, or where the app was attempting unsuccessfully to check in. Periodically, the app would be woken up (using an AlarmManager, for example) and compare its location with those in the database. If the app leaves this area, where it is known to be impossible to send a text, it resumes checking in. If it wakes up and discovers that it is nearing the edge of the area where it is known to be impossible to send a text, it will re-enter "discovery mode" and resume attempting to check in. This scheme would require that more information is saved in the database because an exhaustive list of "known-to-be-impossible" texting locations would need be stored in the database. It would require a significant amount of battery power to map this out the first time, but once that was done, the operation of the app would be smoother because it could enter and leave the low-power mode automatically, whenever entering or leaving the "known-to-be-impossible" locations.

When using multiple phones or information from other adventurers, a problem that needs to be addressed (or at least understood) can develop. A phone with a better radio might be able to successfully check in in an area that a phone with a weaker radio had flagged as "known-to-be-impossible." So by flagging areas as "known-to-be-impossible," people might not become aware of texting locations that they could, in fact, discover and use. This problem could be mitigated by making the "known to be impossible" list specific to particular models of phones, and/or by gathering a significant amount of data before putting a location on the "known to be impossible" list. Once enough attempts have been made by enough different models of phones, a more reliable "known to be impossible" map could be constructed. It is worthwhile to note that if cell coverage becomes available in a particular area where it was not available previously, the app would need to recognize this, and let the presence of cell coverage override the "known to be impossible" indication, and attempt to check in, anyway. The central database would need to be updated to reflect this new info as the successful CheckIns start to come in for a previously "Known to be impossible" area. Additionally, it may be desirable to have user's apps periodically attempt to check in in areas considered to be "known to be impossible." This would cause these areas to be periodically tested, but would still provide most of the battery saving benefits of using the "known to be impossible" list.

Note that much of the following information is applicable to the implementation and use of an embodiment of the disclosure on Android smartphones. The algorithms should apply in a general way to other operating systems.

In its simplest form, the ARL app consists of the following items, to support "checking in" (in "discovery mode"):

One or more activities, to support the user-interface

A user-interface including a button to initiate a check in, a means of selecting a contact who will receive the check-in texts, an indication of the current state of the app (e.g. "checking in, no cell service") and an indicator of the current distance from the most recent successful check in.

Additionally, screens for the "Beginning Adventure" and "Ending Adventure" operations could be provided. A screen for displaying CheckIn info and the adventurer's location on a map could be provided, as well as a screen for showing known texting locations from the database, which could be either on a map or in a list.

A service that performs the check-in operation in the background can be used. There is no need for the service to be in a separate thread because it does not use a lot of CPU. It simply attempts to send texts and listens for the result. It is desirable to have a foreground service, so it is not as likely to be killed by Android when more memory is needed. Note that status bar notifications as to the operation of the app are desirable, and required if you have a foreground service.

A PhoneStateListener object can be used. Such an object informs the app when the phone moves in and out of cell coverage.

A BroadcastReceiver object can be used. Such an object listens for broadcasts from the Android system indicating that a text message either failed or was successfully sent.

An interface with the phone's GPS unit can be used. Such an interface communicates with the GPS unit (or other location device) and gathers location data so that the location is available to the app. Potential uses of the location data include: inclusion in the check-in texts/communications, for calculating the distance from the present location to the location of the most recent check in, for calculating proximity to other known texting locations, determining whether the user is in a known-to-be-impossible location, etc.

The app should have access to the current date and time. This is useful for determining if the app has a current or an old GPS fix, and the date/time can also be sent in the check-in texts.

The app can include custom code which formats and sends the communications (e.g., a text message) and selects the contact person who will receive the communications.

The app should also include a clock in the service that "ticks" periodically (e.g. every second) to check on the status of things and to update the UI.

Additionally, a means of communicating between the Activity(s) and the service is useful. In one embodiment, this is accomplished using LocalBroadcastReceiver objects.

Note that in another embodiment of the disclosure, there can be Java objects for the "Adventure", a CheckIn, and a CheckInAttempt. Creating a CheckInAttempt object causes the text message to be sent. When moving in and out of cell coverage, the app may generate a number of CheckInAttempts before receiving a confirmation from the cellular provider that a CheckIn text actually got through. The Adventure contains all the data associated with the current adventure, including a list of all the CheckIns that have occurred in this adventure. Each CheckIn object contains a list of all the CheckInAttempt objects that have occurred as a part of that particular CheckIn. This information has several uses, including generating a kml file, which allows an Adventure to be displayed on Google Earth (or other mapping software that can read a kml file). This information is also used for storing information about discovered texting locations in the database, for debugging in the junit tests, and can be uploaded to the central database on the source equipment.

There are a number of situations where it would be useful to know, for example, that just over a hill is a spot where it is possible to send a check in text. As mentioned previously, one by-product of simply using the ARL app to send an occasional check in text is that it also finds locations where it is possible to send text, and in some cases, even make a voice call or perform another type of communication. This can be a useful convenience, or can even be life-saving in certain situations.

Given the usefulness of knowing where texting locations may be found, in remote areas with poor cell coverage, it makes sense to gather and store these discovered texting locations, and even to share them with others. This is the purpose of the databases of texting locations. In one embodiment, there would be a local database on the adventurer's phone, and a central database on the Internet and/or located on the source equipment 440.

In order to gather data for a database on the user's phone, the app can examine and track three possible outcomes when a CheckInAttempt is initiated. First, the check in text was sent successfully. Second, the check in text was not sent successfully. And third, a "false negative" occurs wherein the text was sent and went through, but the app had no way of knowing this because the acknowledgement that the text was sent did not get from the cell carrier back to the app. This happens sometimes in areas with very poor cell coverage, on the edge of usefulness of the app. (False negatives are detected by the interoperation between the main ARL app and the Buddy app (see below).)

As the user simply uses the ARL app, it is storing the information it gathers about where each of the above occurred (as well as other events as described elsewhere). This information is stored in a local database on the user's phone, and enables the user to view historical data about his/her adventures, and makes it easy for the adventurer to find locations where the app has successfully sent a check in text in the past.

In addition to a local database of texting locations on the adventurer's phone, the present disclosure can include an online database of texting locations (e.g., source equipment 440), so that adventurers may share discovered texting locations. In this way, when an adventurer is planning a trip, he/she may first download the known texting locations into their phone, for the area in which they will be adventuring. This way, rather than having the phone use a lot of battery searching for texting locations, the app (and hence, the adventurer) will know where they are ahead of time, and only initiate the check in operation when there is a texting location nearby. Also, as mentioned previously, the knowledge of where the texting locations are will provide a convenience, and possibly expedited assistance, in an emergency.

In one embodiment, the information on the user's phone may be organized into two tables: an event table that logs notable events on the user's phone; and a "can't text here" table that logs locations where it is not possible to check in (this would be either because the phone has tried and failed, or because the phone indicates that it does not have any cell coverage at this location.

The event table can include the following fields in an embodiment (other fields may be included and/or some of these may not be used, in other embodiments):

Adventure ID (a simple format would be <year>-<month>-<day>-<sequence> where sequence would mostly be "1", but might be incremented in the event that there was more than one adventure in a single day);

Adventurer ID (either "Me" or, if this is a downloaded texting location, the userid of the Adventurer that found it, or "Anonymous," if the adventurer who found the texting location did not want their info published);

Adventure Type (e.g., "Mountain Biking", "Back Country Skiing", "Dual Sport Motorcycling", etc.);

Event Type (e.g. "Starting Adventure," "Starting CheckIn," "Starting CheckInAttempt," "Finishing CheckInAttempt Failure," "Finishing CheckInAttempt False Negative," "Finishing CheckInAttempt Success" (these would be the discovered texting locations), "Lost Cell Service," "Reentered cell service," "Unable to Check In At Texting Location," etc.);

CheckIn Duration (an indication of how difficult it was to find this texting location—i.e. how long the app tried so far to send one or more CheckIn texts associated with this CheckIn.)

CheckInAttempt Duration (another indication of how difficult it was to find this texting location—i.e. how long the app has tried so far, to send this particular CheckIn text.)

Number of CheckInAttempts (so far) in this CheckIn (another indication of how difficult it has been (so far) to find a texting location (which may not have been found yet).)

Distance to Start of CheckIn (how far it is from the location where the CheckIn was initiated to the location where the text was sent; this is another indication of how difficult it was to find this texting location—i.e. how far the user traveled before the check in text was sent.)

Location, latitude (format: e.g. 38.4392; see discussion below about precision. Use the "ActualLocationWhenSent" in the app to populate this field.)

Location, longitude (format: e.g. −106.5712; see discussion below about precision. Use the "ActualLocationWhenSent" in the app to populate this field.)

Location, accuracy (Use the "ActualLocationWhenSent" in the app to populate this field.)

Location, GPS fix age (Use the "ActualLocationWhenSent" in the app to populate this field.)

Location, Speed (The speed of the adventurer at the time the check in succeeded can be an indication of the quality of the texting location. If you are traveling too fast, you will often miss a small, poor quality texting location, because you won't have spent enough time there for the CheckIn to take place. Use the "ActualLocationWhenSent" in the app to populate this field.)

Location, timestamp (Use the "ActualLocationWhenSent" in the app to populate this field.)

DiscoveryModeStatus (enabled/disabled).

For fields that relate to a location (e.g., latitude, longitude, accuracy, GPS fix age, speed, and location timestamp), the following rules may be applied: If the event type is "FinishingCheckInAttemptSuccess," the "ActualLocationWhenSent" field of the CheckIn may be used to populate the Location fields. For all of the remaining event types except "CheckInAttemptFalseNegative," the location the user was in when the event occurred may be used. For "CheckInAttemptFalseNegative," an embodiment of the disclosure might make a database entry for each location the user passed through during the "CheckInAttempt" that resulted in the false negative. This is necessary because, in contrast to successful CheckIns, where the app knows the user's location when the confirmation was received, with a "CheckInAttemptFalseNegative" there is no confirmation received from the cellular network, so the user's location when the text was sent is not known. Note that there will be some variation in the start and finish of the CheckInAttempts from one adventure to another. With enough data samples, it might be possible to get a better idea where a "false negative" texting location actually is. Even without knowing this, it would be possible and useful to have a section of a road or trail, for example, marked in a color on a map to indicate that "somewhere along here, a text might get through."

A note on the precision of locations is important here. In one embodiment, the precision of the latitude and longitude can be 4 decimal places. This has the effect of slicing the world up into chunks that (in a location such as Colorado) are about 30 feet square. The result is that latitude 38.42916 is considered the same as 38.42911, for the purposes of the database query. (In this example, the latitude is truncated, not rounded. It would work either way, but you would want to choose one, and thereafter, always truncate, or always round.) Longitude can be handled exactly the same way. This approximately 30-foot "square" can be considered to be the "size" of a location for the purpose of organizing the database. This simplifies things such as gathering stats for a particular texting location. By considering all texting locations to be the same, as long as they are within the same "30-foot square," we can easily make calculations such as the percentage of CheckIns at that location that are successful, vs. failed. It may be more difficult to make such calculations without a clear definition of what constitutes a "location."

A note on statistics is important here. Since the latitude and longitude (accurate to 4 decimal places) form a unique ID for a given texting location, it is possible to query the database for all records associated with that particular texting location. Given this, it is possible to create queries to generate statistics for particular texting locations. For example, the following useful data/statistics can be gathered (this list includes examples only, and may be enhanced and/or truncated in various embodiments):

Number of successful check ins at this texting location

Number of "Unable To Check In at Texting Location" events at this texting location Number of false negatives at this texting location Average CheckIn duration for this particular texting location (This is an indication of how scarce this texting location is—i.e. how long (on average) the app tried and tried before the check in text was sent. Note that this and all the statistics about scarcity of a texting location will be affected by people knowing where the texting location is, and waiting until they get there to check in (power save mode, described in a previous section). As such, this info should be filtered so that only events that took place with the app in discovery mode should be considered.)

Average number of CheckInAttempts for CheckIns at this location (This is an indication of how scarce this texting location is—i.e. how many CheckInAttempts were generated before the user got to this texting location. As such, this info should be filtered so that only events that took place with the app in discovery mode should be considered.)

Average CheckInAttempt duration for this particular texting location (This is an indication of how scarce this texting location is—i.e. how long (on average) the app tried and tried before the check in text was sent. As such, this info should be filtered so that only events that took place with the app in discovery mode should be considered.)

Average distance to where the CheckIn was initiated (This is an indication of how scarce this texting location is—i.e. how far (on average) the user traveled before the check in text was sent. As such, this info should be filtered so that only events that took place with the app in discovery mode should be considered.)

Success rate of checking in at this particular texting location (use this formula: successRate=(numberOfSuccessfulCheckIns+numberOfFalseNegatives)/(numberOfSuccessfulCheckIns+numberOfFalseNegatives+numberOfUnableToCheckInEvents)

False Negative rate at this texting location (a false negative is a CheckIn text that got through, that the app thought failed, because the confirmation from the cell carrier did not make it back to the phone. The false negative rate can be calculated using this formula: falseNegativeRate=numberOfFalseNegatives/(numberOfSuccessfulCheckIns+numberOfFalseNegatives+numberOfUnableToCheckInEvents).)

Statistics about the speed people were traveling when they achieved a successful check in (For example, if 90% of the people who achieved a successful CheckIn at a particular texting location achieved it at speeds less than 20 MPH, and most of the failures were at higher speeds, that might be useful to know. At lower speeds, more time is spent within a small, weak texting location, increasing the likelihood of a successful CheckIn.)

Number of times a particular texting location has been used.

How to query to find nearby texting locations: In one embodiment, the app is periodically querying to find the nearest event of type "Finishing CheckInAttempt Success" in past adventures (or even earlier in the current adventure). These are the locations where it is possible to send a text. These could be entries created by the current adventurer, or discovered by other adventurers and downloaded from the source equipment. One way to do the query would be to first find all database entries whose latitude and longitude match the current location to a certain number of decimal places (meaning that they are within a certain distance of the current location). For example, if you select locations that match the current location to one decimal place of latitude and longitude, you will get texting locations within 10 to 14 miles of the current location (this is accurate for locations such as Colorado, adjustments need to be made for locations at different latitudes). In the event that there were no texting locations found at one decimal place of precision, the process could be repeated with precision that is more and more coarse until texting locations actually are found.

Once the table entries that are within the specified latitude and longitude are found, use the Android "Location.distanceTo( )" method to calculate the distance to each of the table entries. They can then be displayed on a map along with the user's current location and/or presented in a ListView, sorted by their distance to the adventurer's current location. They can each have the distance to the adventurer's current location displayed, along with information about the quality of the texting location. If one were to travel until that distance is near zero, then one can most likely send a text. This method could also be used to travel to any of the texting locations displayed in a list view.

The organization of the database on the Internet/source equipment (e.g., source equipment 440) can be similar to the organization on the user's phone, but with a few additional and omitted fields. The Adventure ID is omitted, as that is more for the benefit of the particular adventurer, to peruse the history of his/her previous adventures. Although if unique Adventure IDs were generated (say, tying a unique variable to each instance of an ARL app, plus each Adventure), it might be a useful tracking feature. The Event Type field is simplified, because we are primarily interested in events of type "Finishing CheckInAttempt Success," (which are the discovered texting locations) or "Unable to Check In At Texting Location" (so we can calculate a success rate for this texting location), or "Finishing CheckInAttempt False Negative" (so we can calculate a rate of "false negatives" for this texting location. Events of type "Lost Cell Service" or "Reentered Cell Service" are gathered because they might have market value (i.e. selling the data to the cell carriers or others).

Here are some of the fields that may be included in one embodiment of the central database which can be located on the source equipment 440:

Adventurer ID: The userid of the Adventurer that found this texting location, or "Anonymous," if the adventurer who found it did not want their info published.

Discovery sequence: A sequence number for events of type "Finishing CheckInAttempt Success" or "Finishing CheckInAttempt False Negative. These would be sequence numbers for the discovered texting locations discovered by the adventurer. The first texting location they find gets sequence number "1." The second one, "2". Etc. Adventurer ID plus Sequence form a unique id for discovered texting locations. Left blank for other types of events logged in the database.

Cellular carrier (e.g. "Verizon")

Device (e.g. "LG G2" or "Samsung Galaxy S3")

Event Type: "Finishing CheckInAttempt False Negative," "Finishing CheckInAttempt Success" (these would be the discovered texting locations), "Unable To Check In at Texting Location," "Lost Cell Service," "Reentered cell service."

DiscoveryModeStatus (enabled/disabled)

CheckIn Duration: An indication of how difficult it was to find this texting location—i.e. how long the app tried and tried before the check in text was sent.

Number of CheckInAttempts (so far) in this CheckIn: Another indication of how difficult it has been (so far) to find a texting location (which may not have been found yet).

CheckInAttempt Duration: An indication of how difficult it was to find this texting location—i.e. how long the app tried and tried before the check in text was sent.

Distance to Start of CheckIn: How far it is from the location where the CheckIn was initiated to the location where the text was sent. An indication of how difficult it was to find this texting location—i.e. how far the user traveled before the check in text was sent.

Location, latitude (format: e.g. 38.4392 See discussion above about precision. Note: since the location data is uploaded from the database in the user's phone, its source is the "ActualLocationWhenSent" in the app.)

Location, longitude (format: e.g. −106.5712 See discussion above about precision. Note: since the location data is uploaded from the database in the user's phone, its source is the "ActualLocationWhenSent" in the app.)

Location, accuracy (Note: since the location data is uploaded from the database in the user's phone, its source is the "ActualLocationWhenSent" in the app.)

Location, GPS fix age (Note: since the location data is uploaded from the database in the user's phone, its source is the "ActualLocationWhenSent" in the app.)

Location, speed (The speed of the adventurer at the time the check in succeeded can be an indication of the quality of the texting location. If you are traveling too fast, you will often miss a small, poor quality texting location, because you won't have spent enough time in the texting location for the CheckIn to take place. Note: since the location data is uploaded from the database in the user's phone, its source is the "ActualLocationWhenSent" in the app.)

Location, timestamp (Note: since the location data is uploaded from the database in the user's phone, its source is the "ActualLocationWhenSent" in the app.)

Statistics (The statistics gatherable for the database items in the Adventurer's phone (described previously) would also be gatherable for the central Internet database. In addition to those, the following would be gatherable for the Internet database: Success and False Negative rates for different models of phones; Success and False Negative rates at this texting location for different cell carriers; The number of people who have used a particular texting location.

Determining quality of texting locations: It is useful, for a given texting location, to be able to determine its quality—i.e. if you are stranded in a remote area, and you know that a poor quality texting location is ¼ mile away, and a good one is ¾ mile away, in the opposite direction, then you would probably opt to walk a little farther to get to the good one. Fundamentally, the Success rate (as calculated above) and the False Negative rate (as calculated above) should give a good indication as to the quality of a particular texting location. Making these available to the adventurer should assist them greatly in making a decision as to which nearby texting locations to go to.

For fields that relate to a location (e.g., latitude, longitude, accuracy, GPS fix age, speed, and location timestamp), the following rules may be applied: If the event type is "FinishingCheckInAttemptSuccess," the "ActualLocationWhenSent" field of the CheckIn may be used to populate the Location fields. For all of the remaining event types except "CheckInAttemptFalseNegative," the location the user was in when the event occurred may be used. For "CheckInAttemptFalseNegative," one embodiment of the disclosure might make a database entry for each location the user passed through during the "CheckInAttempt" that resulted in the false negative. This is necessary because, in contrast to successful CheckIns, where the app knows the user's location when the confirmation was received, with a "CheckInAttemptFalseNegative" there is no confirmation received from the cellular network, so the user's location when the text was sent is not known. Note that there will be some variation in the start and finish of the CheckInAttempts from one adventure to another. With enough data samples, it might be possible to get a better idea where a "false negative" texting location actually is. Even without knowing this, it would be possible and useful to have a section of a road or trail, for example, marked in a color to indicate that "somewhere along here, a text might get through."

Note that it may be or may not be desirable to filter out trivial texting locations so as not to clutter up the database. A texting location could be considered trivial if the check in occurred in an area with good cell coverage, where one would normally expect a text to go through. If it is desired to filter out the trivial texting locations, this could easily be done by ignoring discovered texting locations where the location where the check in was initiated is very near to the location where the text actually went through (actualLocationWhenSent). So this way, for a texting location to be considered nontrivial, the adventurer would have had to travel a minimum distance (e.g. 100 yards) after the check in was initiated, before the check in text actually went through. This is only possible in an area with poor cell coverage. In an area with good cell coverage, the text goes through immediately after the check in is initiated. The phone would need to be in discovery mode for this test to work.

There are two primary aspects to the task of getting the desired data into the databases: Storing the data in the user's phone as the adventure progresses (and also afterward, in the case of False Negative CheckInAttempts); and Uploading the data to the central database on the Internet/source equipment 440.

Storing the data in the user's phone is straightforward, in the respect that when a storable event occurs, the ARL app would simply create a database entry with the data as described above. Most likely, an SQLite database would be used, as that is commonly used in Android apps. For example, when the app hears via its broadcast receiver that a CheckIn text was sent successfully, it would make an entry into the database of type "Finishing CheckInAttempt Success".

The event that is tricky is the "Finishing CheckInAttempt False Negative" event. It is tricky because it is not known that a particular CheckInAttempt is a false negative at the time the event occurred. As a reminder, a "False Negative" CheckInAttempt is one that the app thought failed, but that actually did go through. This is not known at the time of the event because the confirmation that the text got through did not make it from the cell carrier back to the adventurer's phone. (This is an example of the kinds of things that can happen under conditions of very poor cell coverage.) When there is no confirmation received that the CheckIn text got through, the app records it in the database as a "Finishing CheckInAttempt Failure" event. The only way that the event can be properly recorded as a "Finishing CheckInAttempt False Negative" event is for the information to be provided at a later time, that a particular CheckInAttempt was indeed, successful.

One way to provide the "False Negative" information is via the use of a "Buddy App" on the contact person's phone. The Buddy app can respond automatically to the CheckIn texts it receives, with a confirmation, containing the ID of the CheckInAttempt. This would occur at some point when the adventurer is in good cell coverage, including when the adventure is complete and the adventurer is safely at home, but could also occur during the adventure if the adventurer enters good enough cell coverage for the confirmation texts (or also possibly other signaling methods, such as Internet) to get from the Buddy App on the Contact Person's phone to the main ARL app on the adventurer's phone. Texts may be used for this communication because the adventurer is more likely to get the information during the adventure if s/he is in an area with poor cell coverage. In some cases, it might be useful for the adventurer to know that certain CheckIns are confirmed to have been received, and others have not. This information could be displayed in a ListView or on a map on the ARL app on the Adventurer's phone.

In one embodiment, the app can generate a KML file, which displays CheckIns, and CheckInAttempts on Google Earth (or in the App). They can be color-coded to indicate the disposition of the CheckIn and CheckInAttempt. False negatives can be added thereto.

Uploading the database entries from the adventurer's phone to the central database (on the source equipment, 440) would generally happen when the adventurer is in good cell coverage, and typically at the end of the adventure. In one embodiment, there would be a "Home Safely" portion of the app that the adventurer would execute upon their safe return home. This portion of the app would send a "Home Safely" text to the contact person, and would also upload the new information in their database to the central database on the Internet (with their permission). Note that the ARL app would need to wait for confirmation from the Buddy App that all the feedback about which CheckInAttempts were successful and which ones failed. Once this information has been received by the ARL app from the buddy app, the ARL app would mark the false negatives in its database, and upload it to the central database on the Internet.

One goal of the Buddy app can be to make the contact person's job more convenient and fun. It also provides some helpful functionality to enhance the safety of the adventure, as well.

The Buddy app can receive a "Starting Adventure" text from the adventurer and then notify the contact person that the adventure is starting. In order to do this, the Buddy app would need a service running that is constantly monitoring text messages received, and when the "Starting Adventure" text is received, it would notify the contact person and begin monitoring the adventure.

In one embodiment, the Buddy app can display the locations indicated in the CheckIn texts on a map (either within the Buddy app itself or as links to an external map).

The buddy app can automatically send confirmation texts back to the Adventurer's phone, indicating which CheckInAttempts were successful. The ARL app would then be able to indicate this information on its UI, for the adventurer's benefit, and would also be able to mark False Negatives in the database.

An important feature of the buddy app is that it can monitor the time the Adventurer is supposed to return home. If the Adventurer does not initiate the "Home Safely" process on their app by the designated time, then the buddy app can alert the contact person about this (or even automatically notify search and rescue).

The Buddy app can have "offline maps" (i.e., maps that are stored on the Buddy's device, and available even if there is no service.) This would help a contact person find an adventurer who indicated that there was a problem, even when the contact person was in an area with poor cell coverage. This would make sense, for example, if there was a mechanical breakdown that stranded the adventurer, but no life-or-death situation. The offline map would show the adventurer's CheckInAttempt locations, as well as the contact person's current location as they are moving, which would facilitate them finding the adventurer.

The Buddy app could also display targeted ads. Because a lot is known about the type of adventure the adventurer is involved with, it would be possible to display highly targeted ads (e.g., gift ideas for when the adventurer returns "home", etc.). Additionally, the main ARL app could store a database of ads locally and then display them throughout the adventure; the app can provide links that would be activated once network connection restored.

One non-obvious point is that since the same deliverability issues affect the confirmation texts being sent to the adventurer as affect the CheckIn texts coming from the adventurer, some redundancy is in order, to ensure that the confirmation information is received. A strategy for enhancing deliverability of confirmation texts is to send confirmation texts containing more than one confirmation, so that for each received CheckIn text, there is more than one confirmation sent. A simple way to implement this would be for the confirmation texts to look something like this: "ARL BUDDY APP CONFIRMING 125(4), 125(5), 125(7), 126 (1), 127(2), 127(5), 128(1)." In this example, "125" would indicate CheckIn number 125, and "125(5)" would indicate CheckInAttempt #5 of CheckIn number 125. When each new CheckIn text is received, it would be added to the list and a new confirmation sent. When the length of the confirmation text is about to exceed 160 characters, the earlier CheckInAttempts would be dropped off of the list. It is important not to exceed 160 characters to avoid Android converting it to an MMS message, which might be more difficult to deliver under conditions of poor cell coverage.

When the adventure is over, and the Adventurer indicates "Home Safely" on the ARL app, the Buddy app could resend an SMS or MMS message containing ALL the received CheckInAttempt IDs, prior to the ARL app uploading its data to the central Internet database.

Displaying highly targeted ads: As mentioned above, the Buddy app and the ARL app have access to information about the type of adventure taking place and therefore, about the adventurer's (and to a lesser degree, the contact person's) interests. The assumption is that a usefully high percentage of the time, the contact person and the adventurer will have the same or similar interests. For example, if the contact person is a friend that could not join in on the adventure that day, the chances are that they will have similar interests, and the ads served to the contact person will be well targeted. If the contact person is a spouse or a relative, the likelihood that they will have the same interests as the adventurer is reduced somewhat, but not eliminated.

There are a couple of places where information can be gleaned as to the interests of the people involved. One is the "adventure type" indicated when the adventurer starts his adventure. Another would be by the choice of background image the adventurer (and also the contact person) choose for the app. One feature of the app to make it fun is that it would have user-selectable background images. A library of background images would be provided with a variety of activities shown—hiking, backpacking, mountain biking, motorcycling, four-wheel drive, ATVing, to name a few. A fairly accurate indication as to their interests could be gleaned from their choice of background image. This information could be useful in serving up more targeted ads on the Buddy App.

The Buddy App could share a good deal of code with the ARL app. In some embodiments, the ARL app could have a superset of the Buddy App's functionality. In other words, the ARL app and the Buddy App could be very similar, except for the serving of ads and the ability to send texts. In this way, the ARL app could, in addition to sending CheckIn texts, perform all the functionalities of the Buddy App. This flexibility would allow for sending of CheckIn texts between contact persons and adventurers in a variety of situations and circumstances, and also would allow adventurers to send CheckIn texts to one another that would be sent/received as possible, in the field. However, it may be useful for the Buddy app to be distributed free while the adventurer pays for the ARL app.

In one embodiment, the buddy app consists of one or more Activities, to support the user interface, and a service that would be launched whenever the device is rebooted (i.e. running all the time). The primary job of the service would be to watch for incoming text messages from an ARL app. Text messages from an ARL app could be identified by having the text start (or end) with a unique string, such as "@~% ARL" that would not likely appear in other text messages.

When such a text message is received, the Buddy app would determine whether this text is an "Adventure Starting" message, a "Check In" message, a "Home Safely" message, a "Need Help" message, etc. This could also be indicated by using a specific identifying text string, such as "@~% ARL-S" for "Adventure Starting" texts, "A~% ARL-C" for "Check In" texts, etc.

The actions the buddy app can take include:
Upon receiving "adventure starting" message:
  Put a notification in the status bar to inform the contact person that an adventure has started. Most likely, this notification would include an audible alert.
  Have a method, such as a dialogue box, for the contact person to acknowledge that they are monitoring the Adventure. This information would be sent back to the Adventurer via text when (when possible) so that the adventurer would know that they are being monitored.
  Set a timer for the time that the adventurer is expected to be home safely. If the adventurer has not sent his/her "Home Safely" text by this time, the contact person is alerted by the Buddy app, and/or search and rescue may be automatically notified of the missing person.
  Instantiate a new "Adventure" object, to contain the information related to the adventure. This Adventure object could be subclassed from the Adventure object used in the ARL app with a few changes, such as that instead of generating a text message and sending it when a new CheckInAttempt is created, it would instead store the contents of the text message that was received from the ARL app. This subclassed Adventure object would have a place for the Adventurer's contact info, vehicle info, destination, route, and expected arrival time back at home. A possible design strategy would be to have a generic Adventure object, subclassed by both the ARL app and the Buddy App. The ARL could subclass it, putting in the ARL-specific items, and calling it class "AdventureSending", since the ARL app sends the text messages. The Buddy app could subclass it and add the Buddy-specific methods, and call it class "AdventureReceiving."
  Set the Adventure State for this new AdventureReceiving object to "In Progress."
  Save the data for this new Adventure object in the database, in case the app gets shut down for some reason (so it would remember its state in detail).
Upon receiving a check in text
  Add its info to a new CheckIn or CheckInAttempt object in the AdventureReceiving object
  Update the map to display the CheckIn location. Data such as the time of the CheckIn, accuracy of the location, and comments by the adventurer could be also be displayed, for example, in a balloon that would pop up when the CheckIn icon on the map is tapped.

Send a confirmation text to the ARL app on the Adventurer's phone

Store the current AdventureReceiving object in the database (including the new CheckIn or CheckInAttempt object), in case the app gets shut down for some reason (so it would remember its state in detail).

Upon receiving a "Home Safely" text:
Set the Adventure State to "Completed, home safely."
Send confirmation text(s) back to the ARL app on the adventurer's phone for all CheckIns received for the entire adventure. This is so that the ARL app can properly determine any false negative CheckIns before uploading its data the central Internet database.
Turn off the Expected Return Time alarm.

Upon receiving a "need help" text:
Alert the contact person audibly, and with a pop up on their phone
If the contact person does not engage with the Buddy app after a certain amount of time has elapsed, it might be appropriate for the Buddy app to contact search and rescue automatically. In one embodiment, this contact would be by sending a text message to an organization called GEOS, which coordinates search and rescue efforts worldwide.
If the alarm expires and the ARL app has not yet sent its "Home Safely" text, the Buddy app would alert the contact person. If the contact person does not interact with the Buddy app within a certain period of time, the Buddy app could also possibly contact GEOS and notify them of the missing adventurer. If the contact person does interact with the Buddy app, they would be encouraged to call or text the Adventurer, to make sure they are safe. If they could not be reached, the contact person would have the option of contacting GEOS.

One of the principles of smartphone app development is that it is important to engage your users by making your app fun. Often, products that are intended to be lifesaving are understandably quite serious in their presentation. That said, if it is possible to engage the users in a game that results in more rapid completion of the worldwide database of texting locations, then we have a unique opportunity in which "making it fun saves lives."

Such a game can work as follows:
Present the discovery of texting locations as similar to the discovery of other geographic features, such as mountains, lakes, etc. So when a person is using the app, if they are the first person to discover a texting location, they have the option of naming it after themselves (or more accurately, after their userid).
A possible naming convention for the discovered texting locations would be <userid>-<sequence number>. For example, if the discoverer's userid was "JohnSmith14," the 22nd texting location he discovered could be named "JohnSmith14-22".
It might be fun for people to compete to see who can find the most texting locations. And while they are having all this fun, they are also populating the database of texting locations, which might save a person's life at some point in the future.
If the discoverer wished to remain anonymous, the texting location could be named "Anonymous-422" for example, where the sequence number, "422" would indicate that this was the 422nd texting location discovered where the discoverer wished to remain anonymous.
It might be fun, if the discoverer desires, to have their userid and possibly even their picture indicated on the map of texting locations a person downloads prior to an adventure. This could be in an informational pop-up, displayed when an adventurer would touch the texting location indicated on the map.
It might be fun to have people who use a discovered texting location for an emergency to have a way of thanking the person who first discovered it.
It might be fun to publish stats about how much a particular texting location has been used by the ARL app. This could be a "bragging point" for the person who discovered it.
One consideration is that you would likely want to filter out trivial texting locations (in areas with good cell coverage, where you would expect a text to go through). This is described in the previous section on "Filtering out trivial texting locations". This way, you won't have people walking all through Manhattan, for example, trying to "discover" more texting locations than a person rigorously exploring areas in the Colorado wilderness, for example. The app could easily determine if the discoverer had traveled the minimum required distance (e.g. 100 yards) from the location where the CheckIn was initiated to where the text actually went through.

Obviously, since this is an app that is intended to save people's lives, it is imperative that it be as bug-free as possible. The following methods were used to help ensure this:

Careful code inspection, particularly focused on checking for possible null-pointer errors and memory leaks.
As much as possible, having the app consist of simple methods.
Use of junit tests to test core functionalities.
The app, in its development mode, can generate junit test code all the time, in a special file, as it operates. The junit code can mimic the methods that are called as the app is operating, in a sense "recording" the entire adventure. In the event of some kind of unexpected behavior in the field, this junit code allows the developers to "play back" the situation later, and step through it in the debugger, etc.
The generation of a KML file (or something similar) that shows the operation of the app on a particular "Adventure." The KML file shows the route, color coded as to cell coverage state, and also shows both CheckIns, and CheckInAttempts on the map. This can uncover unexpected behavior, such as finding check in attempts that the app thought failed but actually having gotten through. This disclosure can generalize as follows: For a given piece of code that needs to be reliable, find a way to create a graphical representation of its behavior, particularly as it relates to critical functionality. Make it so that the key functionalities really stand out, and any unexpected behaviors are obvious. This amounts to using pattern-matching capabilities in the human brain to quickly process a lot of information visually, and detect erroneous behavior.

References made to "timeout reached occurs" are specifically defined to include: the action is canceled by user, the phone is turned off, an actual timer runs out, a set number of attempts has been reached, etc.

References to the "Buddy App" are specifically defined to include: a very basic version of the buddy app is an app/program that receives texts (this could be operated by a contact person, located at a server, a web site, etc.). An additional embodiment of a Buddy App could leverage existing programs such as Google Maps to overlay location information on a map.

After an adventure occurs, the buddy app and the adventure rescue locator app can communicate to determine all successful and not successful texting locations that were found during an adventure.

Figure 3:
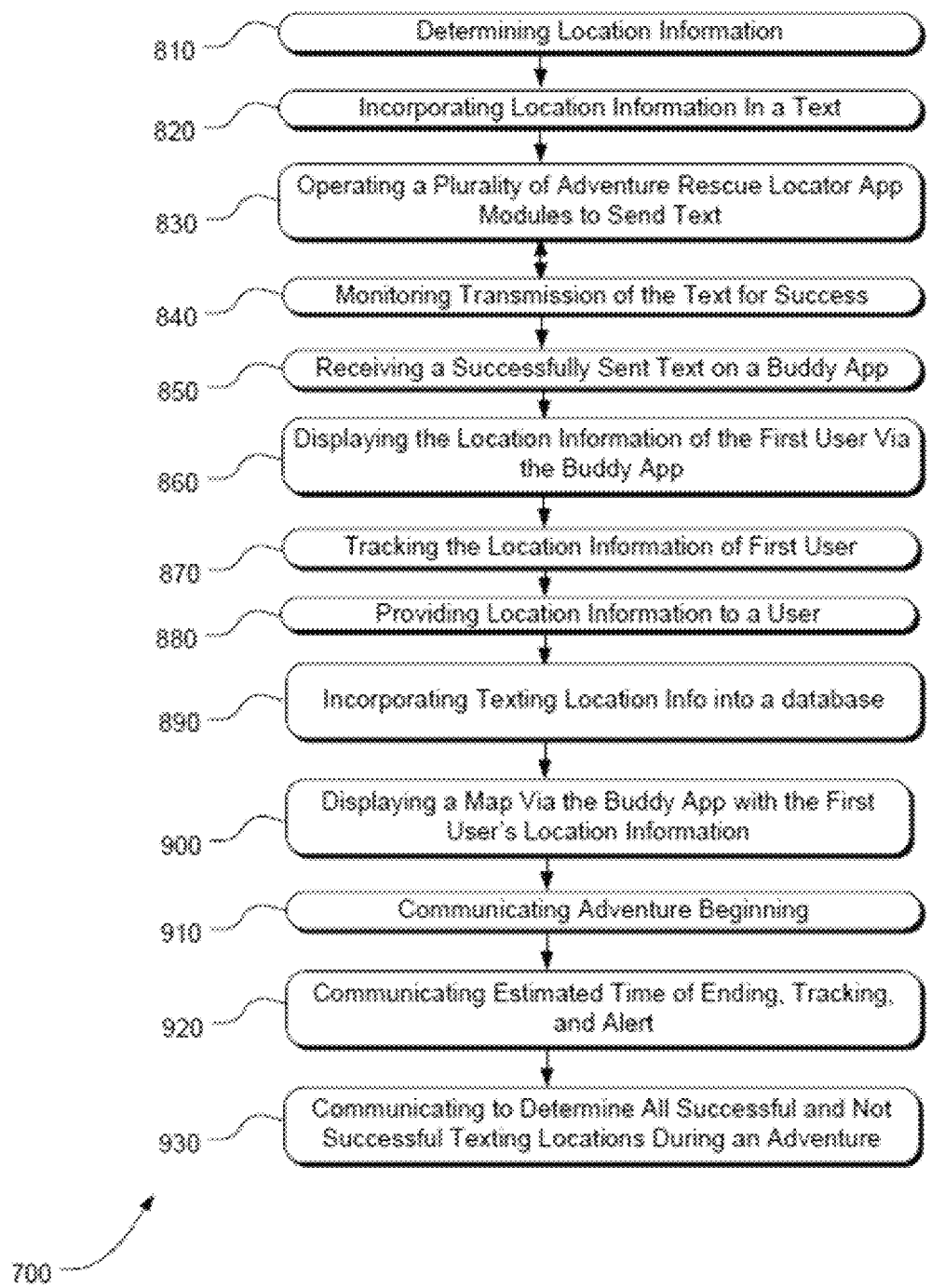
FIG. 3 illustrates another embodiment of methods and tools that can be utilized to determine texting locations and network coverage.

FIG. 3 illustrates another embodiment of methods and tools 700 that can be utilized to determine texting locations and network coverage. A determining location information step 810 can utilize a global positioning system to determine location information for a first user. An incorporating location information in a text step 820 includes taking the location information and drafting a text containing that location information. The step of operating a plurality of adventure rescue locator app modules to send text 830 is undertaken utilizing the plurality of computing devices to send the text across a communications network. Once the text has been sent, the step of monitoring transmission of the text for success 840 and repeating sending the text with at least one of real-time updated location information and original location information until at least one of success is achieved and timeout is reached occurs is carried out in order to track the success or failure.

The step of receiving a successfully sent text on a buddy app 850 includes a Buddy App (which can be a mobile phone, device, server, website, etc. operating a module) receiving the text successfully. Once the text is received, the step of displaying the location information of the first user via the buddy app 860 can occur. Here, the first user's location information that was transmitted via the text is displayed. This can be accomplished via a map overlay, by showing coordinates, and/or by showing aggregate data derived from their location and optionally the locations of others (or statistics such as how many people at a texting location in a specific time period) on a report etc. Tracking the location information of the first user 870 can include tracking the location information of the first user for at least one location at which the transmission of the text was at least one of successful and not successful.

The step of providing location information to a user 880 can include providing at least one of successful and not successful texting location information to one of a first user and a second user in order to allow the user to travel to the successful texting location in order to send an additional text.

The step of incorporating texting location information into a database 890 can include incorporating at least one of successful and not successful texting location information into a texting location database.

The step of displaying a map via the buddy app with the first user's location information 900 can include utilizing the buddy app to display a map containing the first user's location information. The step of communicating adventure beginning 910 includes the adventure rescue locator app communicating with the buddy app that the first user has begun an adventure.

The step of communicating estimated time of ending, tracking, and alert 920 can include the adventure rescue locator app communicating with the buddy app an estimated time of ending of the adventure and the buddy app tracks elapsed time so as to alert the second user if the adventure rescue locator app does not communicate an end of adventure with the buddy app by the estimated time of ending.

The step of communicating to determine all successful and not successful texting locations during an adventure 930 includes the ARL app communicating with the buddy app to determine texting locations (at least one of successful and not successful) encountered during an adventure.

Figure 4:
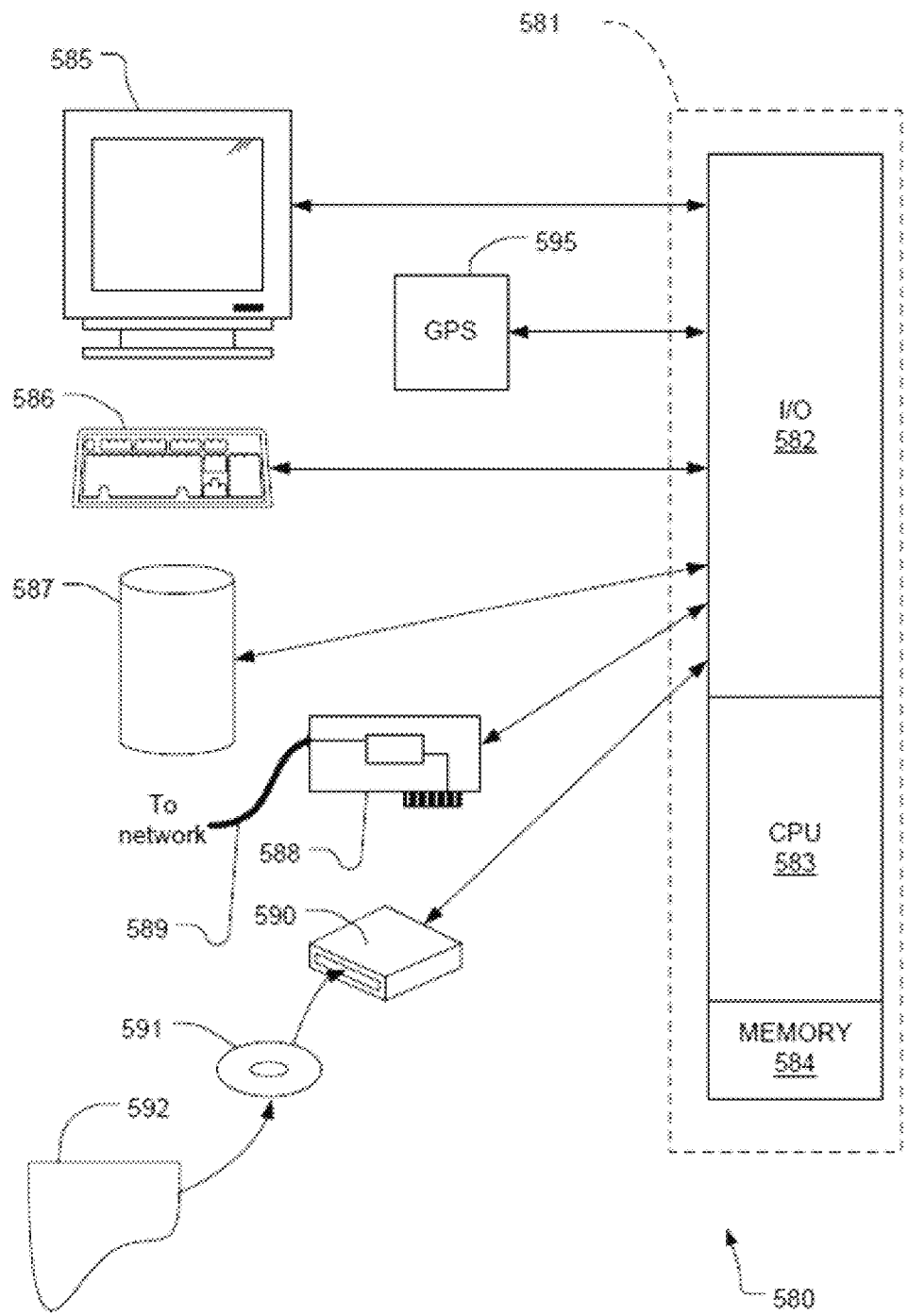
FIG. 4 illustrates an embodiment of a computer system useful in implementations of the described technology.

FIG. 4 illustrates an embodiment of a computing system 580 useful in implementations of the described technology. A general purpose computer system 580 is capable of executing a computer program product to execute a computer process. Data and program files may be input to the computer system 580, which reads the files and executes the programs therein. Some of the elements of a general purpose computer system 580 are shown in FIG. 4 wherein a processor 581 is shown having an input/output (I/O) section 582, a Central Processing Unit (CPU) 583, and a memory section 584. There may be one or more processors 581, such that the processor 581 of the computer system 580 comprises a single central-processing unit 583, or a plurality of processing units, commonly referred to as a parallel processing environment. The computer system 580 may be a conventional computer, a distributed computer, or any other type of computer. The described technology is optionally implemented in software devices loaded in memory 584, stored on a configured DVD/CD-ROM/OPTICAL DISC 591 or storage unit 587 (which can include SD cards, flash memory, etc.), and/or communicated via a wired or wireless network link 589 on a carrier signal, thereby transforming the computer system 580 in FIG. 4 into a special purpose machine for implementing the described operations. The computing system 580 provides a means for enabling the processor(s) 581 to access a plurality of modules in memory 584/storage 587 for the systems and methods for determining texting locations and network coverage. The computing system 580 further provides a second means for enabling the processor(s) 581 to implement the plurality of modules.

The I/O section 582 is connected to one or more user-interface devices (e.g., a keyboard 586 and a display unit 585 which could include touchscreen capabilities), a disk storage unit 587, and a disk drive unit 590. Generally, in contemporary systems, the disk drive unit 590 is a DVD/CD-ROM/OPTICAL drive unit capable of reading the DVD/CD-ROM/OPTICAL DISC medium 591, which typically contains programs and data 592. Said drive unit 590 may alternatively be a USB thumb drive, memory stick, or any other memory/storage medium. Computer program products containing mechanisms to effectuate the systems and methods in accordance with the described technology may reside in the memory section 584, on a disk storage unit 587, or on the DVD/CD-ROM/OPTICAL medium 591 of such a system 580. Alternatively, a disk drive unit 590 may be replaced or supplemented by a floppy drive unit, a tape drive unit, or other storage medium unit. A Global Positioning System (GPS) 595 can be accessed by the system 580 as well. The network adapter 588 is capable of connecting the computer system to a network via the network link 589, through which the computer system can receive instructions and data embodied in a carrier wave. Examples of such systems include SPARC systems developed by Sun Microsystems, Inc., personal computers offered by Dell Corporation and by other manufacturers of personal computers, Apple-based computing systems, ARM-based computing systems and other systems running a UNIX-based or other operating system. It should be understood that computing systems may also embody devices such as Personal Digital Assistants (PDAs), mobile phones, gaming consoles, set top boxes, etc.

When used in a LAN-networking environment, the computer system 580 is connected (by wired connection or wirelessly) to a local network through the network interface or adapter 588, which is one type of communications device. When used in a WAN-networking environment, the computer system 580 typically includes a modem, a network adapter, or any other type of communications device for establishing communications over the wide area network. In a networked environment, program modules depicted relative to the computer system 580 or portions thereof, may be stored in a remote memory storage device. It is appreciated that the network connections shown are examples and other means of, and devices for, establishing a communications link between the computers may be used.

In accordance with an implementation, software instructions and data directed toward implementing a document revision manager and other operations may reside on disk storage unit 587, disk drive unit 590 or other storage medium units having computer readable logic embodied in said storage medium and coupled to the system (directly and/or through a network interface 588). Said software instructions may also be executed by processor CPU 583. The embodiments of the disclosure described herein can be implemented as logical steps in one or more computer systems. The logical operations of the present disclosure are implemented (1) as a sequence of processor-implemented steps executing in one or more computer systems and/or (2) as interconnected machine or circuit modules within one or more computer systems. The implementation is a matter of choice, dependent on the performance requirements of the computer system implementing the embodiment. Accordingly, the logical operations making up the embodiments described herein may be referred to variously as processes, services, threads, operations, steps, objects, or modules. Furthermore, it should be understood that logical operations may be performed in any order, unless explicitly claimed otherwise or a specific order is inherently necessitated by the claim language.

Figure 5:
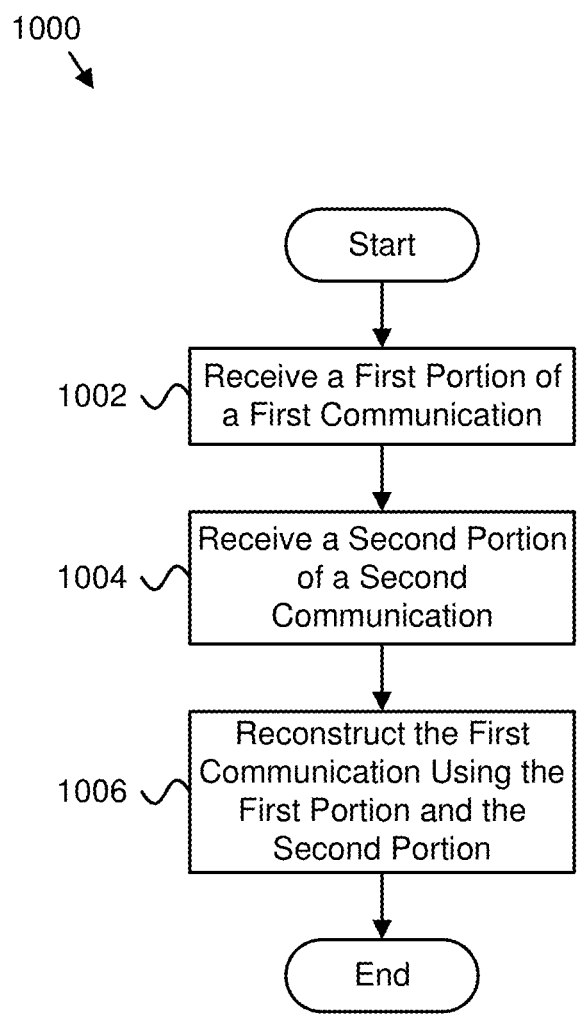
FIG. 5 illustrates one embodiment of a method for reconstructing a communication.

FIG. 5 illustrates one embodiment of a method 1000 for reconstructing a communication. This may be useful in areas where cell coverage is so poor that only fragments of a communication can get through. The method 1000 includes receiving 1002 a first portion of a first communication. The method 1000 also includes receiving 1004 a second portion of a second communication. In certain embodiments, the second communication is a duplicate of the first communication (e.g., a repeat transmission). In various embodiments, each of the first communication and the second communication may be a message that is repeated over and over in a single short message service ("SMS") message and/or multiple SMS messages. In some embodiments, each of the first communication and the second communication may be a message that is repeated over and over using a low level communication (e.g., communication built in to a cell phone standard, code built in to an operating system, etc.). A cell tower and/or base station that receives the first portion of the first communication and the second portion of the second communication may only receive portions that are less than the complete communication because of poor cell coverage. As may be appreciated, a cell phone may roam such that if a signal is available on any carrier at the user's location, the first communication and/or the second communication may be sent over a different carrier than the user's normal carrier.

If the first communication and/or the second communication are able to be sent through any carrier, the first communication and/or the second communication will be sent. If the first communication and/or the second communication are not able to be sent, a map may be displayed showing possible texting locations (optionally) for all carriers. If the user is not in cell coverage for any carrier, the user may use the map to move to the nearest location that a text can go through (e.g., as shown on the map). In certain embodiments, a special type of emoji may be available for inclusion into the text. The emoji used may indicate a type of assistance requested/needed by the user. For example, the emoji may be a picture of a fire truck, police officer, tow truck, ambulance, search and rescue team, and so forth. As may be appreciated, an emoji may be used because it may be represented by a single Unicode character, and/or may be represented efficiently in a text message. Moreover, such an emoji may be user friendly for the user requesting assistance. In various embodiments, a message may indicate its status as an emergency message. For example, a special Unicode character at the beginning of a message and/or sporadically through the message may be used in the message to indicate its status as an emergency message. In some embodiments, if a cellular network receives a message including an emergency indicator, the message may be given special priority by the cellular network.

The method 1000 includes reconstructing 1006 the first communication using the first portion and the second portion. In various embodiments, the first portion is received via a first carrier and the second portion is received via a second carrier. In some embodiments, the first communication is an emergency communication (e.g., a communication sent by a user in an emergency situation such as a situation involving an injury, a fire, getting lost, lack of resources, etc.). In one embodiment, the emergency communication includes one or more of: an indication of a type of emergency, information identifying a location of the emergency, an indication of an accuracy of the information identifying the location of the emergency, and an indication of a time that an emergency communication is initiated.

In certain embodiments, the first communication includes an emergency indicator. In such embodiments, the emergency indicator may include one or more of a Unicode character, a predetermined combination of bits, a predetermined binary string, an icon, a picture, and an emoji. In various embodiments, the emergency indicator includes a pattern of bits corresponding to a location from which the first communication was sent. In some embodiments, the emergency indicator includes a predetermined number of repetitions of data corresponding to a location from which the first communication was sent. In certain embodiments, the emergency indicator includes a plurality of bytes. In such embodiments, a first pair of bytes of the plurality of bytes may indicate a type of emergency. In some embodiments, a second pair of bytes and a third pair of bytes of a plurality of bytes indicate a location from which the first communication was sent.

Figure 6:
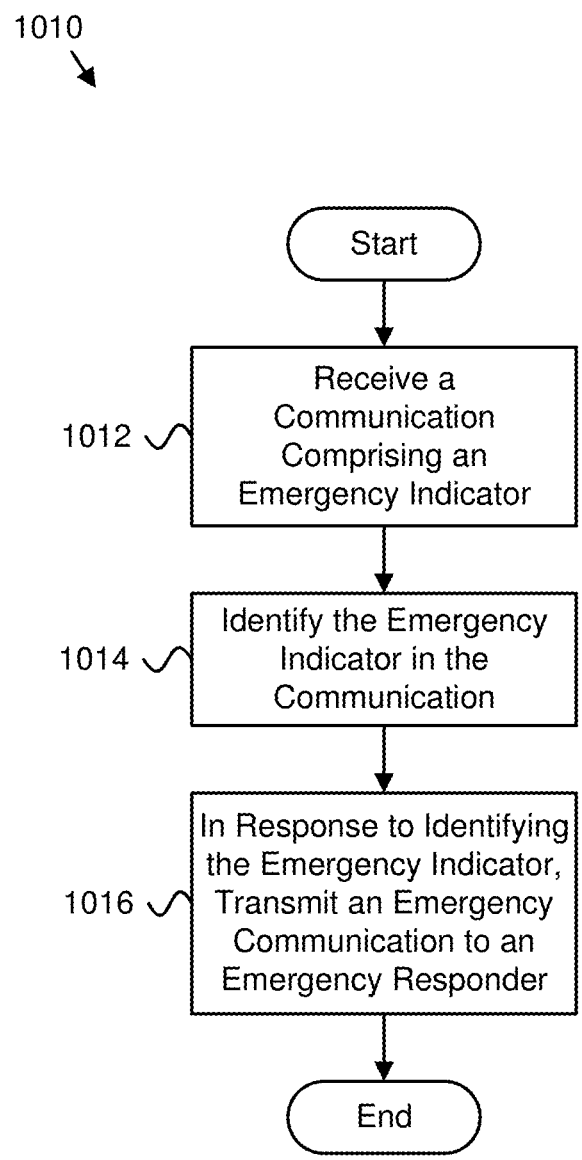
FIG. 6 illustrates one embodiment of a method for using a communication containing an emergency indicator to get help to a distressed user.

FIG. 6 illustrates one embodiment of a method 1010 for using a communication containing an emergency indicator to get help to a distressed user. The method 1010 includes receiving 1012 a communication (e.g., text message, email message, voice message, picture, etc.) having an emergency indicator. The method 1010 also includes identifying 1014 the emergency indicator in the communication. The method 1010 includes, in response to identifying the emergency indicator, transmitting 1016 an emergency communication to an emergency responder. In some embodiments, the emergency indicator includes one or more of: location information (e.g., location of a cell phone), an accuracy of the location information, a type of emergency, and a time that an emergency communication is initiated.

In various embodiments, the emergency indicator includes one or more of a Unicode character, a predetermined combination of bits, a predetermined binary string, an icon, a picture, and an emoji. In certain embodiments, the emergency indicator includes a plurality of bytes. In some embodiments, a first pair of bytes of the plurality of bytes indicates a type of emergency. In one embodiment, a second pair of bytes and a third pair of bytes of the plurality of bytes indicate a location from which the first communication was sent.

In some embodiments, an integer representation of a latitude and/or longitude may be encoded in one or more sets of 16 bits.

In some embodiments, the emergency indicator may indicate a type of assistance needed by an individual or user (e.g., search and rescue). There may be a number of different Unicode characters, patterns of bits, patterns of bytes, and/or other indicators that indicate search and rescue. In one embodiment, a Unicode character that indicates search and rescue also indicates an accuracy of location information grouped with the Unicode character. For example, a cell phone may produce highly accurate or inaccurate location data, and first responders may respond differently depending on the accuracy of the location info. So if the accuracy of the GPS of a cell phone is known to be 24 meters, for example, the "search and rescue" Unicode character chosen may indicate that the accuracy is between 10 and 50 meters.

In one embodiment, an emergency communication may have a Unicode character plus two sets of two bytes used to provide information to assist a person in getting help. In some embodiments, the first Unicode character may be a "type of emergency and/or accuracy" indicator, and the two sets of two bytes each may be a latitude and/or a longitude represented in binary form.

In one embodiment, a cell phone may be close to a cell tower that it is communicating with, and the cell tower's location may be known. As such, two decimal digits worth of "least significant digits" of latitude and/or longitude may be encoded into a pair of bytes. For example, if the longitude of the cell tower is known to be −105.4382, the −105.4 part of a cell phone's longitude may be assumed by the cell tower receiving communication from the cell phone. Therefore if a longitude portion of an emergency text is "67" then a longitude of the cell phone may be constructed to be "−105.467" which may be within approximately 300 yards of the cell phone.

In various embodiments, a location of a cell phone may be transmitted in two bytes if the location of a cell tower is known. For example, if a cell tower's location is 42.8634 (latitude), −105.7783 (longitude), and a user's cell phone location is 42.8021 (latitude), −105.7935 (longitude), an emergency communication may transmit "021" for latitude and "935" for longitude, with the latitude and longitude encoded into three bytes because 8 bits may be used to encode 0-255, 10 bits may be used to encode 0-1024, and 20 bits (e.g., 3 bytes=24 bits) may be used to encode two three digit numbers from 0-1024.

The 10-bit representations of the least significant bits of the latitude and longitude may be appended to the truncated latitude and longitude of the cell tower. For example, 021 (the cell phone location's latitude least significant digits) may be appended to 42.8 (the cell tower's truncated latitude) to result in a cell phone latitude of 42.8021. As may be appreciated, longitude may be handled similarly.

For purposes of Search and Rescue ("SAR"), locations with only three digits of precision may get the SAR team within a few hundred yards of a cell phone user's actual location. Accordingly, it may be possible to use a slight modification of the above mentioned strategy to get the cell phone user's location into two bytes. For example, if a cell phone user's location has a latitude of 42.863, and a longitude of −105.778, "63" may be encoded into a first byte and "78" may be encoded into a second byte. Accordingly, an emergency indicator and a location may be stored in three bytes.

In some embodiments, an emergency communication may be encoded into two bytes. For example, a latitude and longitude may be encoded into two bytes as described above. The two-byte latitude and longitude may be sent in a message that repeats the two bytes over and over. The emergency indicator of the emergency communication may be indicated by there being a repeating 4-digit sequence of bytes. For example, using the numbers from above, the message may be 637863786378 . . . . The repeated bytes may be repeated for a predetermined number of times. For example, a certain number of repetitions, such as a 4-digit sequence of bytes repeating 13 times, may indicate that the message is a certain type of emergency. In certain embodiments, the number of repetitions may correspond to a type of emergency.

In various embodiments, an emergency indicator of an emergency communication may be indicated by a delimiter between repeating latitude and/or longitude coordinates. For example, a delimiter "." as in "6378.6378.6378.6378 . . . ." may indicate one type of emergency. Thus, if a cell tower receives a fragment, such as "378.6378.6378.6" it may recognize this as an emergency communication coming from a location having a latitude 42.863 and a longitude −105.778. The delimiter character may be different depending upon a type of emergency.

In some embodiments, an emergency communication message format may be selected based on an amount of cell coverage available. In other embodiments, an emergency communication message format may rotate between different types of message formats. For example, first a communication message of a first type may be transmitted, such as "6378.6378.6378.6378 . . . ." (which may be less accurate than possible, but gets received under the worst conditions). Second, a communication message of a second type may be transmitted, such as "<2-byte emergency indicator> <2 byte latitude> <2 byte longitude>" repeated multiple times. The first and second message types may be repeated over and over. If the cell coverage is bad, and the second type of message is not received by a cell tower, maybe the first type of message is received by the cell tower. If the cell coverage is good, the second type of message may indicate resources for emergency responders to bring, and/or may indicate a very precise location.

Figure 7:
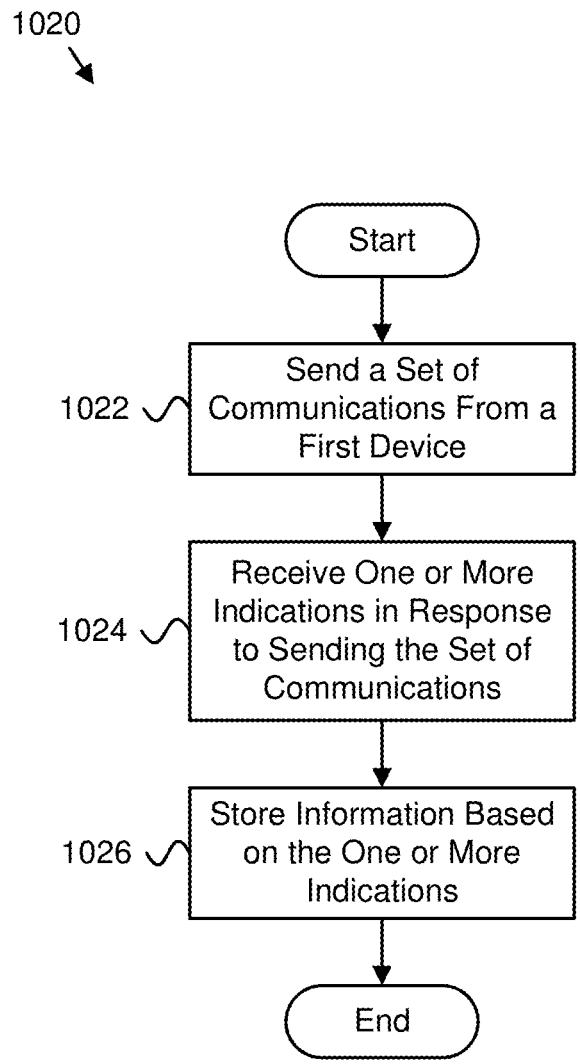
FIG. 7 illustrates one embodiment of a method for determining and storing information based on an outcome of attempted communications.

FIG. 7 illustrates one embodiment of a method 1020 for determining and storing information based on an outcome of attempted communications. The method 1020 includes sending 1022 a set of communications from a first device. In some embodiments, the set of communications is not initiated by a user. For example, in certain embodiments, a cell phone in a remote area may periodically send a test text to a cell carrier to facilitate mapping locations where it is and/or is not possible to send a text message. In such embodiments, the test text messages may be sent without the cell phone user's awareness and/or at no charge to them. In some embodiments, the test text messages may be sent with user's permission. In various embodiments, a battery level may be used to determine whether to send the test text messages. For example, if there is a low battery condition, the test text messages may not be sent.

The method 1020 also includes receiving 1024 one or more indications in response to sending the set of communications. In various embodiments, the one or more indications correspond to one or more communications of the set of communications and indicate reception of the one or more communications. The method 1020 includes storing 1026 information based on the one or more indications. In certain embodiments, the information identifies one or more of: at least one location from which the first device sent a communication, one or more devices that received the communication, and an acknowledgment was received indicating that the one or more devices received the communication; at least one location from which the first device sent a communication, the one or more devices that received the communication, and no acknowledgement was received indicating that the one or more devices received the communication; and at least one location from which the first device sent a communication and the one or more devices did not receive the communication. For example, a cell phone may keep track of where texts do and/or do not receive an acknowledgment based on where the texts are sent from.

In some embodiments, the method 1020 includes providing the information to a second device. In one embodiment, storing 1026 information based on the one or more indications includes comparing the one or more indications to a history of communications sent from the first device. In certain embodiments, sending 1022 the set of communications from the first device includes sending the set of communications over one or more cell carriers. In various embodiments, sending the set of communications includes repeatedly sending a communication at the expiration of a predetermined period of time. In some embodiments, the method 1020 includes generating a map that displays representations of the stored information. In one embodiment, sending 1022 the set of communications from the first device includes sending the set of communications from the first device in response to determining that the first device is in a reduced cell coverage area. In certain embodiments, the method 1020 includes inhibiting sending the set of communications from the first device in response to determining that a power level of the first device is below a predetermined threshold power level.

Figure 8:
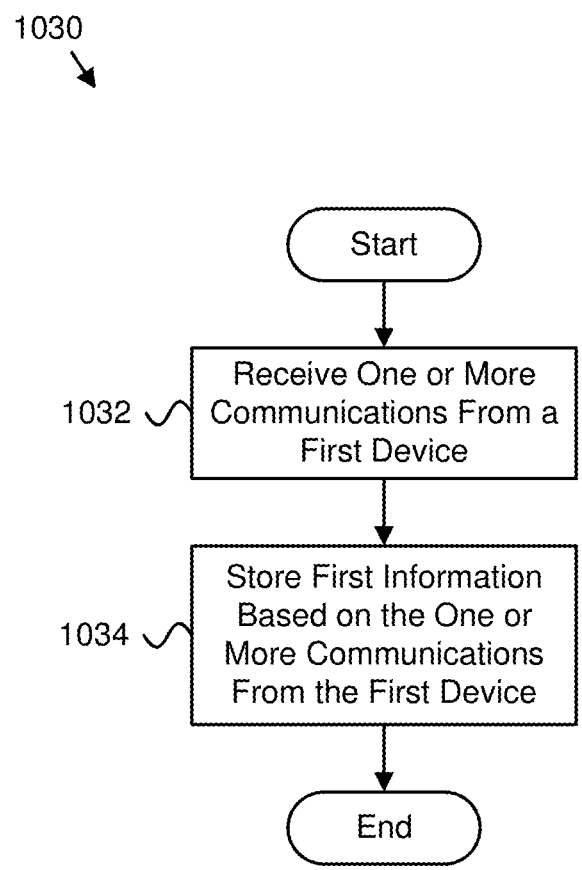
FIG. 8 illustrates one embodiment of another method for determining and storing information based on an outcome of attempted communications.

FIG. 8 illustrates one embodiment of another method 1030 for determining and storing information based on an outcome of attempted communications. The method 1030 includes receiving 1032 one or more communications from a first device. The method 1030 also includes storing 1034 first information based on the one or more communications from the first device. In some embodiments, the first information corresponds to one or more locations from which the one or more communication were sent from the first device. In certain embodiments, the first information may be used to determine a last known location of a user using the first device. In some embodiments, the user may opt in and/or opt out of information being stored based on their communications. In such embodiments, the user may be informed that opting in might speed up their rescue in the event that it is needed.

In certain embodiments, the first information includes information corresponding to one or more times that the one or more communications were received. In some embodiments, the method 1030 includes receiving one or more communications from a second device; and storing second information based on the one or more communications from the second device. In such embodiments, the second information may correspond to one or more locations from which the one or more communication were sent from the second device. In various embodiments, the method 1030 includes generating data indicating whether the first device operates better than the second device at a predetermined location. In certain embodiments, the method 1030 includes selectively generating a map indicating the first information based on a user selection. In some embodiments, the method 1030 includes providing the first information to a second device. In one embodiment, the first information includes a manufacturer of the first device, a model of the first device, or some combination thereof. In various embodiments, the method 1030 includes determining whether an expected communication is missing from the one or more communications received from the first device. In certain embodiments, the method 1030 includes generating an alert in response to determining that the expected communication is missing. In some embodiments, the method 1030 includes generating a last known location in response to determining that the expected communication is missing.

In various embodiments, the method 1030 includes: receiving a communication history from the first device; comparing the communication history from the first device with the one or more communications received from the first device; and storing information based on comparing the communication history from the first device with the one or more communications received from the first device. In such embodiments, the information may identify one or more of: at least one location from which the first device sent a communication, one or more devices that received the communication, and an acknowledgment was received indicating that the one or more devices received the communication (e.g., "successes"); at least one location from which the first device sent a communication, the one or more devices that received the communication, and no acknowledgement was received indicating that the one or more devices received the communication (e.g., "false negatives"); and at least one location from which the first device sent a communication and the one or more devices did not receive the communication (e.g., "failures").

Figure 9:
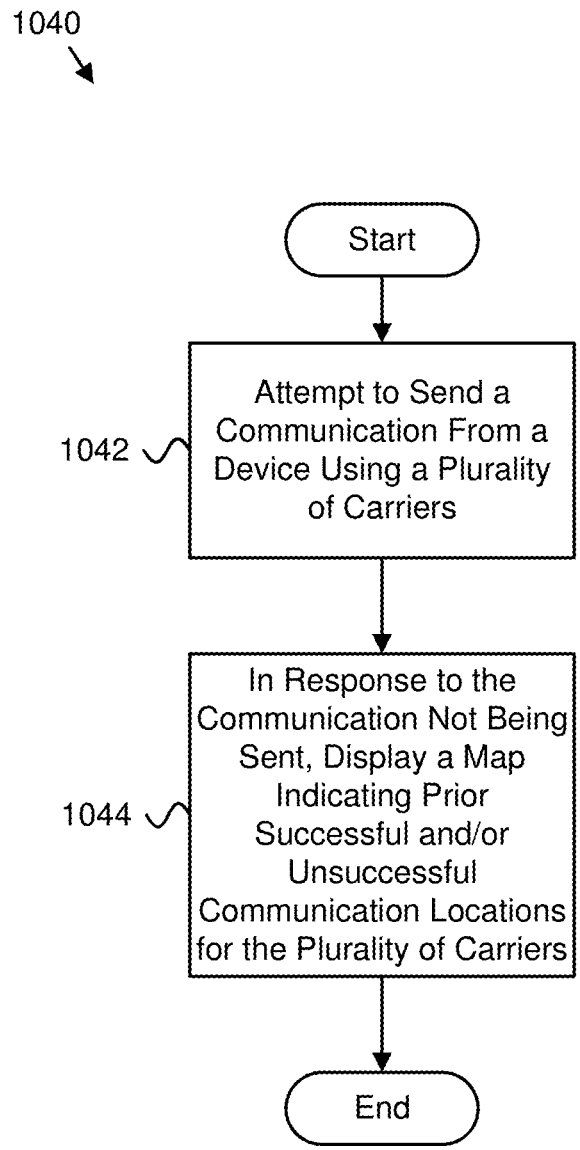
FIG. 9 illustrates one embodiment of a method for assisting a user in relocating to an area with sufficient cell coverage to successfully complete a communication.

FIG. 9 illustrates one embodiment of a method 1040 for assisting a user in relocating to an area with sufficient cell coverage to successfully complete a communication. The method 1040 includes attempting 1042 to send a communication (e.g., an emergency communication, an urgent communication, etc.) from a device using a plurality of carriers. The method 1040 also includes, in response to the communication not being sent, displaying 1044 a map indicating prior successful and/or unsuccessful communication locations for the plurality of carriers. In some embodiments, the plurality of carriers includes each carrier capable of communicating with the device. In the event that an attempted communication fails, the user may use the map to relocate to a nearby area (if one exists) where there is sufficient cell coverage to send a message and, in certain embodiments, get help.

While particular embodiments have been described and disclosed in the present application, it is clear that any number of permutations, modifications, or embodiments may be made without departing from the spirit and the scope of this disclosure.

Particular terminology used when describing certain features or aspects of the embodiments should not be taken to imply that the terminology is being redefined herein to be restricted to any specific characteristics, features, or aspects with which that terminology is associated. In general, the terms used in the following claims should not be construed to be limited to the specific embodiments disclosed in the specification, unless the above Detailed Description section explicitly defines such terms. Accordingly, the actual scope of the claims encompasses not only the disclosed embodiments, but also all equivalent ways of practicing or implementing the claimed subject matter.

The above detailed description of the embodiments is not intended to be exhaustive or to limit the disclosure to the precise embodiment or form disclosed herein or to the particular fields of usage mentioned above. While specific embodiments and examples are described above for illustrative purposes, various equivalent modifications are possible within the scope of the disclosure, as those skilled in the relevant art will recognize. Also, the teachings of the embodiments provided herein can be applied to other systems, not necessarily the system described above. The elements and acts of the various embodiments described above can be combined to provide further embodiments.

Any patents, applications and other references that may be listed in accompanying or subsequent filing papers, are incorporated herein by reference. Aspects of embodiments can be modified, if necessary, to employ the systems, functions, and concepts of the various references to provide yet further embodiments.

In light of the above "Detailed Description," the Inventor may make changes to the disclosure. While the detailed description outlines possible embodiments and discloses the best mode contemplated, no matter how detailed the above appears in text, embodiments may be practiced in a myriad of ways. Thus, implementation details may vary considerably while still being encompassed by the spirit of the embodiments as disclosed by the inventor. As discussed herein, specific terminology used when describing certain features or aspects should not be taken to imply that the terminology is being redefined herein to be restricted to any specific characteristics, features, or aspects of the embodiments with which that terminology is associated.

While certain aspects are presented below in certain claim forms, the inventor contemplates the various aspects in any number of claim forms. Accordingly, the inventor reserves the right to add additional claims after filing the application to pursue such additional claim forms for other aspects.

The above specification, examples and data provide a description of the structure and use of implementations of the described systems, articles of manufacture and methods. It is important to note that many implementations can be made without departing from the spirit and scope of the disclosure.

What is claimed is:

1. A method comprising:
   sending a set of communications from a first device to one or more network devices, wherein the set of communications is not initiated by a user, and the first device is a mobile device;
   receiving one or more indications at the first device in response to sending the set of communications, wherein the one or more indications correspond to one or more communications of the set of communications and indicate successful reception of the one or more communications by the one or more network devices;
   storing information at the first device based on the one or more indications, wherein the information identifies one or more of:
      information corresponding to a successful communication comprising at least one location from which the first device sent a communication, one or more devices that received the communication, and an acknowledgment was received indicating that the one or more devices received the communication;
      information corresponding to a false negative communication comprising at least one location from which the first device sent a communication, the one or more devices that received the communication, and no acknowledgement was received indicating that the one or more devices received the communication; and
      information corresponding to a failed communication comprising at least one location from which the first device sent a communication and the one or more devices did not receive the communication;
   providing the information to a second device; and
   providing the stored information to a user to indicate locations at which one or more of successful communications, false negative communications, and failed communications have occurred.

2. The method of claim 1, wherein storing information based on the one or more indications comprises comparing the one or more indications to a history of communications sent from the first device.

3. The method of claim 1, wherein sending the set of communications from the first device comprises sending the set of communications over more than one cell carrier.

4. The method of claim 1, wherein sending the set of communications comprises repeatedly sending a communication at the expiration of a predetermined period of time.

5. The method of claim 1, further comprising generating a map that displays representations of the stored information.

6. The method of claim 1, wherein sending the set of communications from the first device comprises sending the set of communications from the first device in response to determining that the first device is in a reduced cell coverage area.

7. The method of claim 1, further comprising inhibiting sending the set of communications from the first device in response to determining that a power level of the first device is below a predetermined threshold power level.

8. A method comprising:
   receiving, at a third device, one or more communications from a first device, wherein the first device is a mobile device;
   storing, at the third device, first information based on the one or more communications from the first device, wherein the first information corresponds to one or more locations from which the one or more communication were sent from the first device, wherein the one or more locations are used to map locations at which the mobile device is able to communicate, and wherein the first information identifies one or more of:
      information corresponding to a successful communication comprising at least one location from which the first device sent a communication, one or more devices that received the communication, and an acknowledgment was received indicating that the one or more devices received the communication;
      information corresponding to a false negative communication comprising at least one location from which the first device sent a communication, the one or more devices that received the communication, and no acknowledgement was received indicating that the one or more devices received the communication; and information corresponding to a failed communication comprising at least one location from which the first device sent a communication and the one or more devices did not receive the communication; and providing the first information to a second device, wherein the second device is a mobile device.

9. The method of claim 8, wherein the first information comprises information corresponding to one or more times that the one or more communications were received.

10. The method of claim 8, further comprising:
receiving one or more communications from a second device; and
storing second information based on the one or more communications from the second device, wherein the second information corresponds to one or more locations from which the one or more communication were sent from the second device.

11. The method of claim 10, further comprising generating data indicating whether the first device operates better than the second device at a predetermined location.

12. The method of claim 8, further comprising selectively generating a map indicating the first information based on a user selection.

13. The method of claim 8, wherein the first information comprises a manufacturer of the first device, a model of the first device, or some combination thereof.

14. A method comprising:
receiving, at a third device, one or more communications from a first device, wherein the first device is a mobile device;
storing, at the third device, first information based on the one or more communications from the first device, wherein the first information corresponds to one or more locations from which the one or more communication were sent from the first device, wherein the first information indicates successful communication locations;
receiving a communication history from the first device;
comparing the communication history from the first device with the one or more communications received from the first device; and
storing information based on comparing the communication history from the first device with the one or more communications received from the first device, wherein the information identifies one or more of:
information corresponding to a successful communication comprising at least one location from which the first device sent a communication, one or more devices that received the communication, and an acknowledgment was received indicating that the one or more devices received the communication;
information corresponding to a false negative communication comprising at least one location from which the first device sent a communication, the one or more devices that received the communication, and no acknowledgement was received indicating that the one or more devices received the communication;
information corresponding to a failed communication comprising at least one location from which the first device sent a communication and the one or more devices did not receive the communication; and
providing the stored information to a user to indicate locations at which at one or more of successful communications, false negative communications, and failed communications have occurred.

15. A method comprising:
receiving, at a third device, one or more communications from a first device, wherein the first device is a mobile device;
storing, at the third device, first information based on the one or more communications from the first device, wherein the first information corresponds to one or more locations from which the one or more communication were sent from the first device, and the first information indicates successful communication locations, and wherein the first information identifies one or more of:
information corresponding to a successful communication comprising at least one location from which the first device sent a communication, one or more devices that received the communication, and an acknowledgment was received indicating that the one or more devices received the communication;
information corresponding to a false negative communication comprising at least one location from which the first device sent a communication, the one or more devices that received the communication, and no acknowledgement was received indicating that the one or more devices received the communication; and
information corresponding to a failed communication comprising at least one location from which the first device sent a communication and the one or more devices did not receive the communication; and
determining whether an expected communication is missing from the one or more communications received from the first device.

16. The method of claim 15, further comprising generating an alert in response to determining that the expected communication is missing.

17. The method of claim 15, further comprising generating a last known location in response to determining that the expected communication is missing.

* * * * *